(12) United States Patent
Yamashita

(10) Patent No.: US 12,491,821 B2
(45) Date of Patent: Dec. 9, 2025

(54) MULTI-PURPOSE SUPPORT DEVICE

(71) Applicant: NIFCO INC., Yokosuka (JP)

(72) Inventor: Takahiro Yamashita, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 18/696,777

(22) PCT Filed: Dec. 7, 2022

(86) PCT No.: PCT/JP2022/045098
§ 371 (c)(1),
(2) Date: Mar. 28, 2024

(87) PCT Pub. No.: WO2023/120192
PCT Pub. Date: Jun. 29, 2023

(65) Prior Publication Data
US 2024/0409034 A1    Dec. 12, 2024

(30) Foreign Application Priority Data
Dec. 21, 2021   (JP) ................. 2021-207002

(51) Int. Cl.
*B60R 7/08*    (2006.01)
*B60R 5/04*    (2006.01)

(52) U.S. Cl.
CPC ............... *B60R 7/08* (2013.01); *B60R 5/044* (2013.01)

(58) Field of Classification Search
CPC ................. B60P 7/0807; B60R 7/08
See application file for complete search history.

(56) References Cited

U.S. PATENT DOCUMENTS

| | | | | |
|---|---|---|---|---|
| 4,820,093 A | * | 4/1989 | Hirakui | B64D 9/00 410/107 |
| 4,820,094 A | * | 4/1989 | Hirakui | B60P 7/0823 403/322.4 |

(Continued)

FOREIGN PATENT DOCUMENTS

| | | |
|---|---|---|
| JP | S56-003773 A | 1/1981 |
| JP | S61-044039 A | 3/1986 |

(Continued)

OTHER PUBLICATIONS

PCT/ISA/210, "International Search Report for PCT International Application No. PCT/JP2022/045098," Feb. 7, 2023.

(Continued)

*Primary Examiner* — Bradley Duckworth
(74) *Attorney, Agent, or Firm* — HAUPTMAN HAM, LLP

(57) ABSTRACT

A support device includes a movable body provided movably between an advanced position for forming a projection on an object, and a retracted position for forming a recess on the object. The multi-purpose support device includes a casing body movably supporting the movable body, a biasing body exerting a biasing force to the movable body, and a control mechanism for the movable body. The control mechanism performs a cycle of controlling the movable body including: temporal holding of the movable body at a reference position; first pushing of the movable body at the reference position toward a retracted position against the biasing force; causing the biasing force to move the movable body after the first pushing, to an advanced position; second pushing of the movable body at the advanced position against the biasing force; and causing the biasing force to move the movable body to the reference position.

6 Claims, 21 Drawing Sheets

(56) References Cited

U.S. PATENT DOCUMENTS

| | | | | |
|---|---|---|---|---|
| 4,890,566 | A * | 1/1990 | Morris | B63B 21/045 |
| | | | | 24/115 R |
| 4,945,849 | A * | 8/1990 | Morris | B60P 7/0807 |
| | | | | 24/115 R |
| 5,444,897 | A * | 8/1995 | Gross | B60P 7/0807 |
| | | | | 24/265 CD |
| 6,565,301 | B1 * | 5/2003 | Lin | B60P 7/0807 |
| | | | | 410/107 |
| 6,692,067 | B2 * | 2/2004 | Inari | B60N 3/023 |
| | | | | 224/313 |
| 7,669,821 | B2 * | 3/2010 | Martin | B60R 7/08 |
| | | | | 248/306 |

FOREIGN PATENT DOCUMENTS

| | | |
|---|---|---|
| JP | S61-052051 U | 4/1986 |
| JP | S63-008353 U | 1/1988 |
| JP | H06-001649 U | 1/1994 |
| JP | 3733034 B2 | 1/2006 |

OTHER PUBLICATIONS

Notice of Reasons for Refusal for Japanese Application No. 2021-207002 mailed on Oct. 29, 2024; 10 pp.

* cited by examiner

MULTI-PURPOSE SUPPORT DEVICE

FIELD OF THE INVENTION

The present invention relates to an improvement of a multi-purpose support device with a function of forming a projection that can be used for purposes, such as hooking, and a recess that can be used for purposes, such as fitting, as required, on a target object to which the multi-purpose support device is attached.

BACKGROUND OF THE INVENTION

Patent Literature 1 discloses a support device for an assist grip installed inside a cabin of an automobile. Such a support device provides an attachment member for attaching the assist grip, with an enclosure housing where a hook member is housed slidably. In this support device, the hook member is formed so that its end surface is flush with the outer surface of the attachment member when enclosed and that the hook member protrudes from the outer surface of the attachment member when in use so as to be usable for hooking and other purposes inside the automobile cabin.

CITATION LIST

Patent Literature

Patent Literature 1: Japanese Patent No. 3733034

SUMMARY OF THE INVENTION

Technical Problem

A main problem to be addressed by the present invention is to reasonably improve the usability of this kind of support device.

Solution to Problem

To achieve the objective described above, the present invention provides a multi-purpose support device for providing a movable body that forms a part of a design surface of a target object at a reference position, the movable body being provided in a manner movable between an advanced position for forming a projection usable for a purpose such as hooking on the target object, and a retracted position for forming a recess usable for a purpose such as fitting on the target object, the multi-purpose support device comprising:
  a casing body that movably supports the movable body, and that is to be attached to the target object;
  a biasing body that urges the movable body toward the advanced position; and
  a control mechanism for the movable body, wherein the control mechanism performs a cycle of controlling the movable body, the cycle including temporal holding of the movable body at the reference position; first pushing of the movable body at the reference position toward the retracted position against the biasing force; causing the biasing force to move the movable body after the first pushing, to the advanced position; second pushing of the movable body at the advanced position against the biasing force; and causing the biasing force to move the movable body after the second pushing, to the reference position.

While the support device is not in use, the movable body temporarily held at the reference position is allowed to form a part of the design surface of the target object. In this manner, the support device is prevented from disturbing the design of the target object while the support device is not in use.

Furthermore, with the first pushing, the movable body having been temporarily held can be released and moved to the retracted position. As a result, a recess is formed on the target object, advantageously, usable for purposes such as fitting.

Furthermore, by releasing the first pushing, the movable body can be moved to the advanced position. As a result, a projection is formed on the target object, advantageously, usable for purposes such as hooking.

Furthermore, with the second pushing, the movable body at the advanced position can be moved to the retracted position. As a result, the recess is formed on the target object again, advantageously, usable for purposes such as fitting.

Furthermore, by releasing the second pushing, the movable body can be moved to the reference position. As a result, the configuration in which the movable body forms a part of the design surface of the target object is recovered, advantageously.

According to one aspect of the present invention, the control mechanism includes a heart cam, and a pin that traces the heart cam; and one of the heart cam or the pin is provided to the movable body, and the other is provided to the casing body.

According to another aspect of the present invention, the biasing body is a compressed coil spring disposed between the movable body and the casing body.

According to another aspect of the present invention, the casing body is enabled to receive an end of a rod-like body, to inside of the casing body, while the movable body is at the retracted position.

According to another aspect of the present invention, the casing body includes an engaging counterpart that is engaged with an engaging portion provided to the movable body, wherein one of the engaging portion and the engaging counterpart is provided as an elongated guide hole extending in a direction of a movement of the movable body, and the other one of the engaging portion and the engaging counterpart is provided as an elastic piece that enables entry of the movable body into the casing body by elastically deforming, and that goes into the elongated guide hole by elastically recovering at a predetermined insertion position.

According to another aspect of the present invention, the casing body has a projection opening for the movable body, and the casing body is assembled and fixed to the target object in such a manner that the projection opening communicates with a pass-through hole provided to the target object, on a non-design surface that is on an inner side of the target object.

According to another aspect of the present invention, the casing body has a projection opening for the movable body, an outer collar at the projection opening and a projecting piece provided behind the outer collar and projecting outwards; and the casing body is fixed to the target object by using a pass-through hole provided to the target object and a cutout that is continuous to the pass-through hole and through which the projecting piece is passed, the casing body being fixed by inserting a part of the casing body including the projecting piece behind the outer collar into the target object, and turning the casing body to nip or clamp the target object between the outer collar and the projecting piece from outside and inside, respectively.

Advantageous Effects of Invention

According to the present invention, it is possible to form a projection or a recess on a target object with a movable body that forms a part of the design surface of the target object at the reference position, and to provide a highly usable support device capable of supporting various types of articles in various ways.

DESCRIPTION OF EMBODIMENTS

Figure 1:
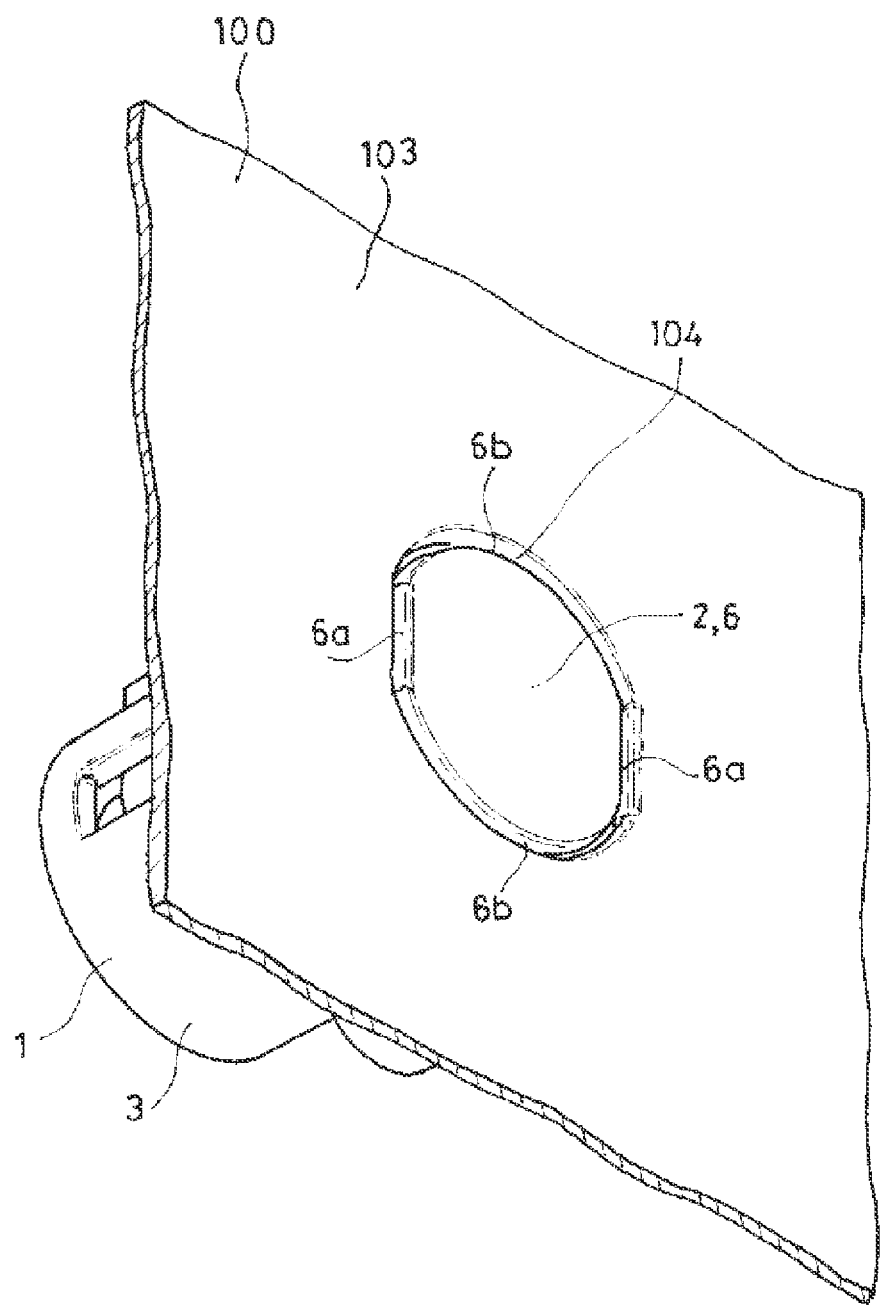
FIG. 1 is a perspective view of a support device (first example) according to one embodiment of the present invention in a use condition, with a movable body at a reference position, viewed from the outer side of a target object.

An exemplary embodiment of the present invention will now be explained with reference to FIGS. 1 to 23. A support device 1 according to this embodiment has a function of forming a projection 101 (see FIG. 3) or a recess 102 (see FIG. 5) on a target object 100 (see FIG. 1), as required, the projection 101 being usable for purpose, such as hooking, and the recess 102 being usable for purposes, such as fitting. The support device 1 also has a function of forming a part of a design surface 103 of the target object 100 (see FIG. 1) when a projection 101 and a recess 102 are not necessary.

As a typical example, the support device 1 is provided inside a cabin Ma of a vehicle M, as required (see FIG. 22), and is used for the purpose of supporting various kinds of articles inside the cabin Ma. To use, the support device 1 is assembled to a trim that is a target object 100 forming the wall of the cabin Ma, using a pass-through hole 104 provided to the trim (see FIG. 1).

The support device 1 includes a movable body 2 (see FIG. 1) to form a part of the design surface 103 of the target object 100 when the movable body 2 is at a reference position. By assembling and fixing the support device 1 to the target object 100 in the manner as described above, the support device 1 serves to provide the target object 100 with a movable body 2 that is movable between an advanced position (see FIG. 3) and a retracted position (see FIG. 5). The movable body 2, at the advanced position, forms a projection 101 on the target object 100 that can be used for purposes such as hooking, and, at the retracted position, forms a recess 102 on the target object 100 that can be used for purposes such as fitting.

Figure 11:
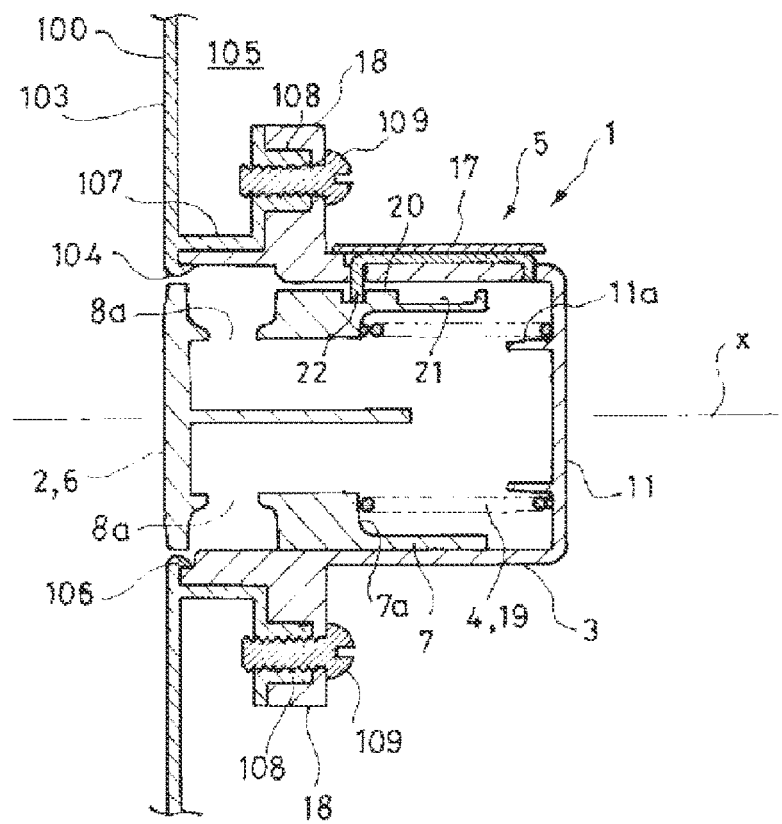
FIG. 11 is a sectional end view of the support device in FIG. 10 cut along the line A-A.
Figure 12:
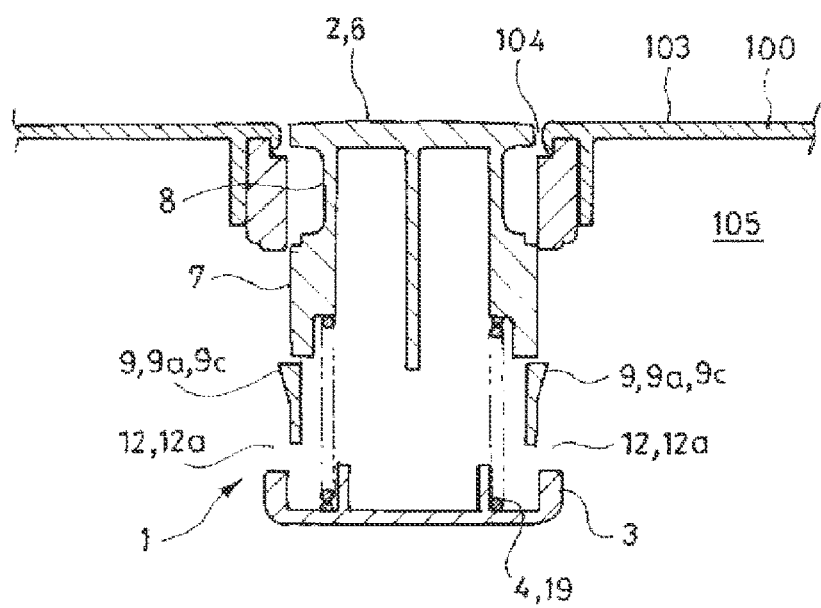
FIG. 12 is a sectional end view of the support device in FIG. 10 cut along the line B-B.
Figure 13:
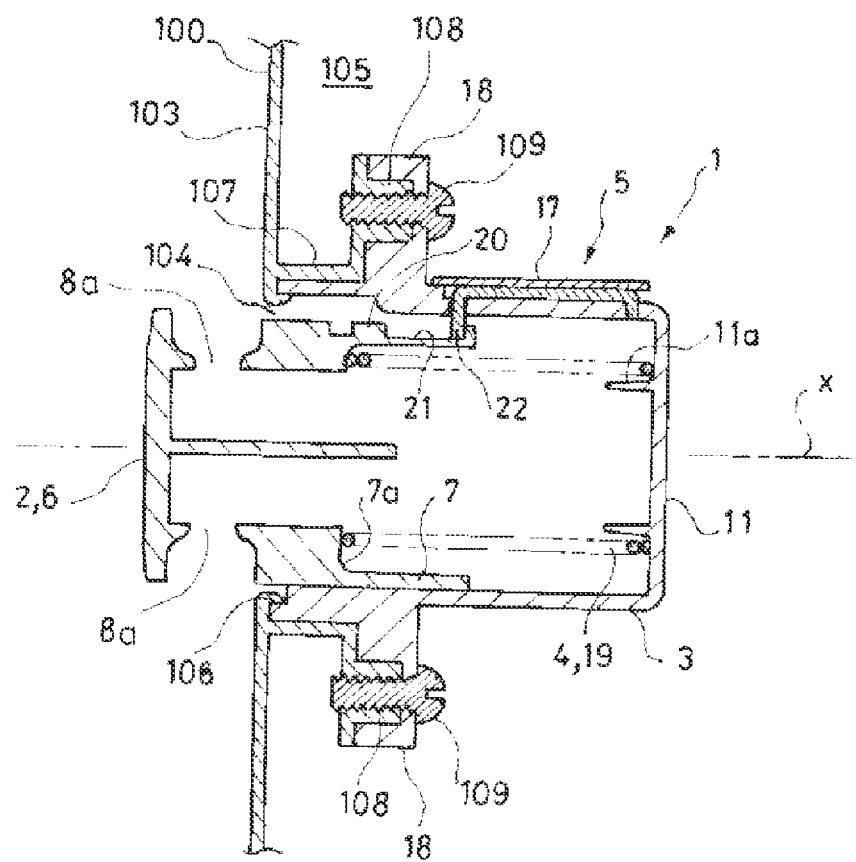
FIG. 13 is a sectional end view of the support device cut along the line A-A, with the movable body at the advanced position.

The support device 1 includes a casing body 3 that movably supports the movable body 2, and that is attached to the target object 100; a biasing body 4 that constantly exerts a biasing force on the movable body 2 toward the advanced position; and a control mechanism 5 for the movable body 2 (see FIGS. 11 and 13).

When the movable body 2 is at the reference position, a front end 6 of the movable body 2 substantially closes the pass-through hole 104 and becomes continuous to the design surface 103 around the pass-through hole 104, whereby forming a part of the design surface 103. In the example illustrated, with the movable body 2 at the reference position, the front end 6 of the movable body 2 is substantially flush with the design surface 103 (FIG. 1).

Figure 3:
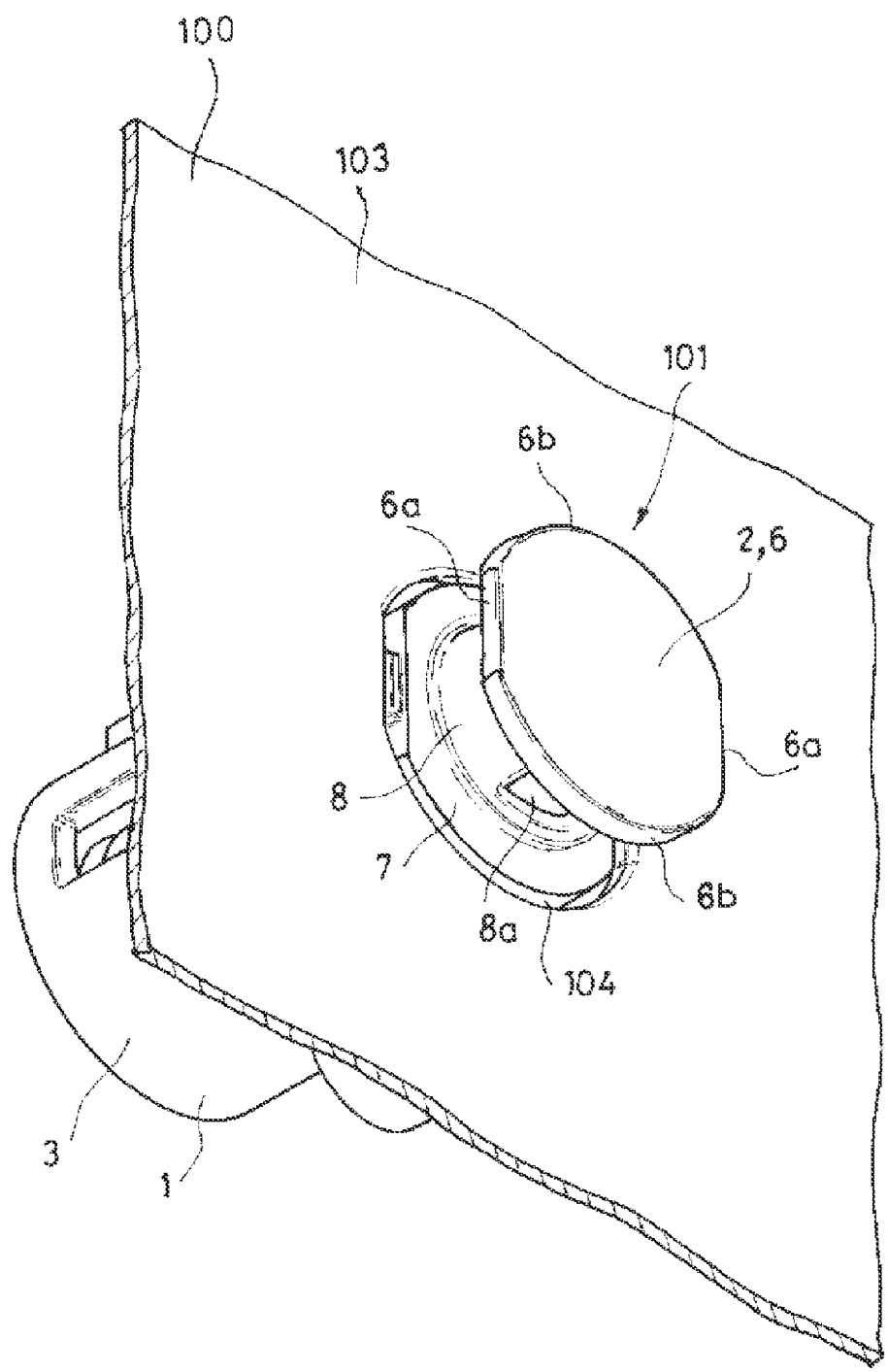
FIG. 3 is a perspective view of the support device illustrating the first example in the use condition, with the movable body at an advanced position, viewed from the outer side of the target object.
Figure 4:
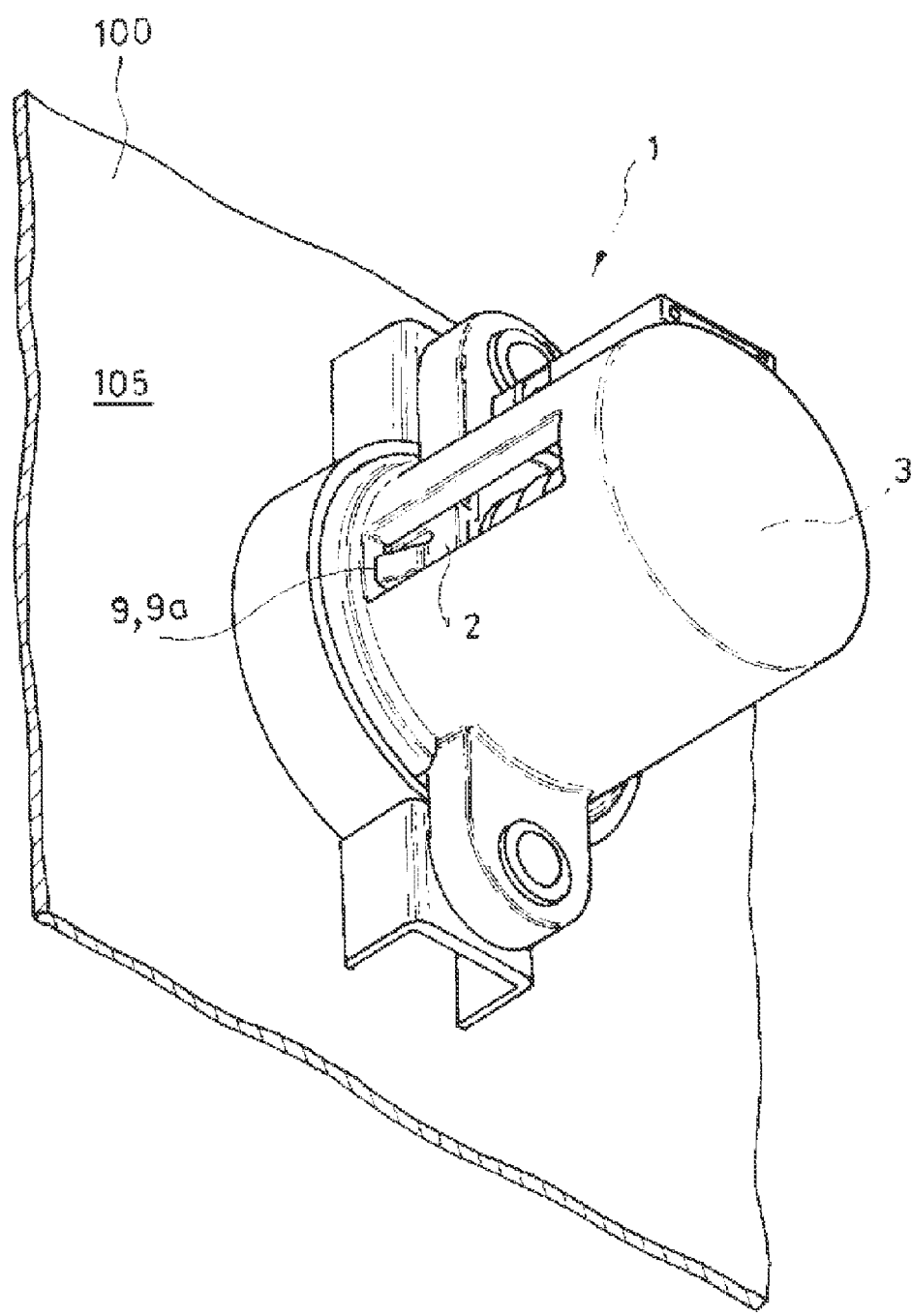
FIG. 4 is a perspective view of the support device illustrating the first example in the use condition, with the movable body at the advanced position, viewed from the inner side of the target object.

When the movable body 2 is at the advanced position, the front end 6 of the movable body 2 is at a position on the outer side of the design surface 103 around the pass-through hole 104, whereby forming the projection 101 on the target object 100 (FIG. 3).

Figure 5:
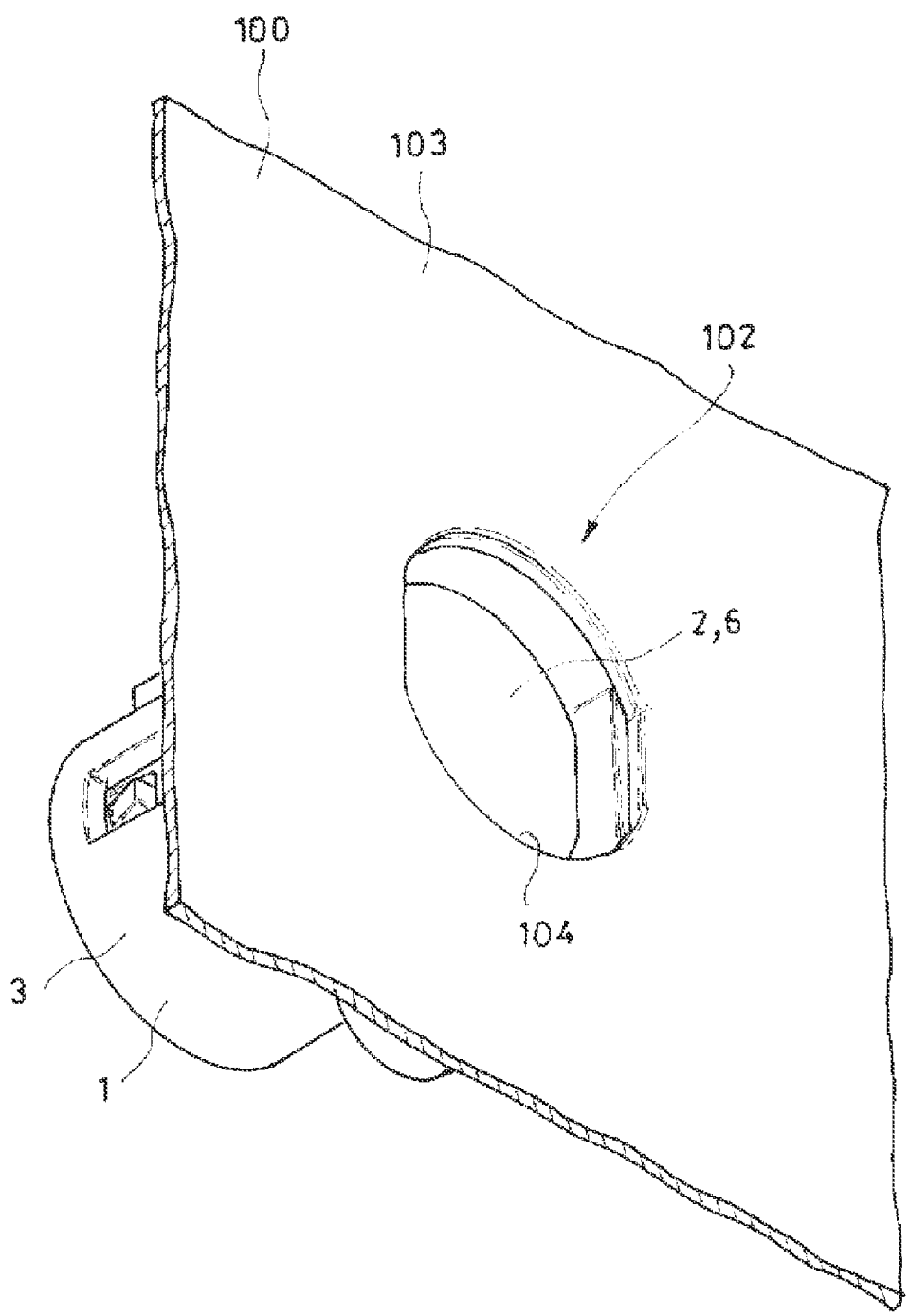
FIG. 5 is a perspective view of the support device illustrating the first example in the use condition, with the movable body at a retracted position, viewed from the outer side of the target object.
Figure 6:
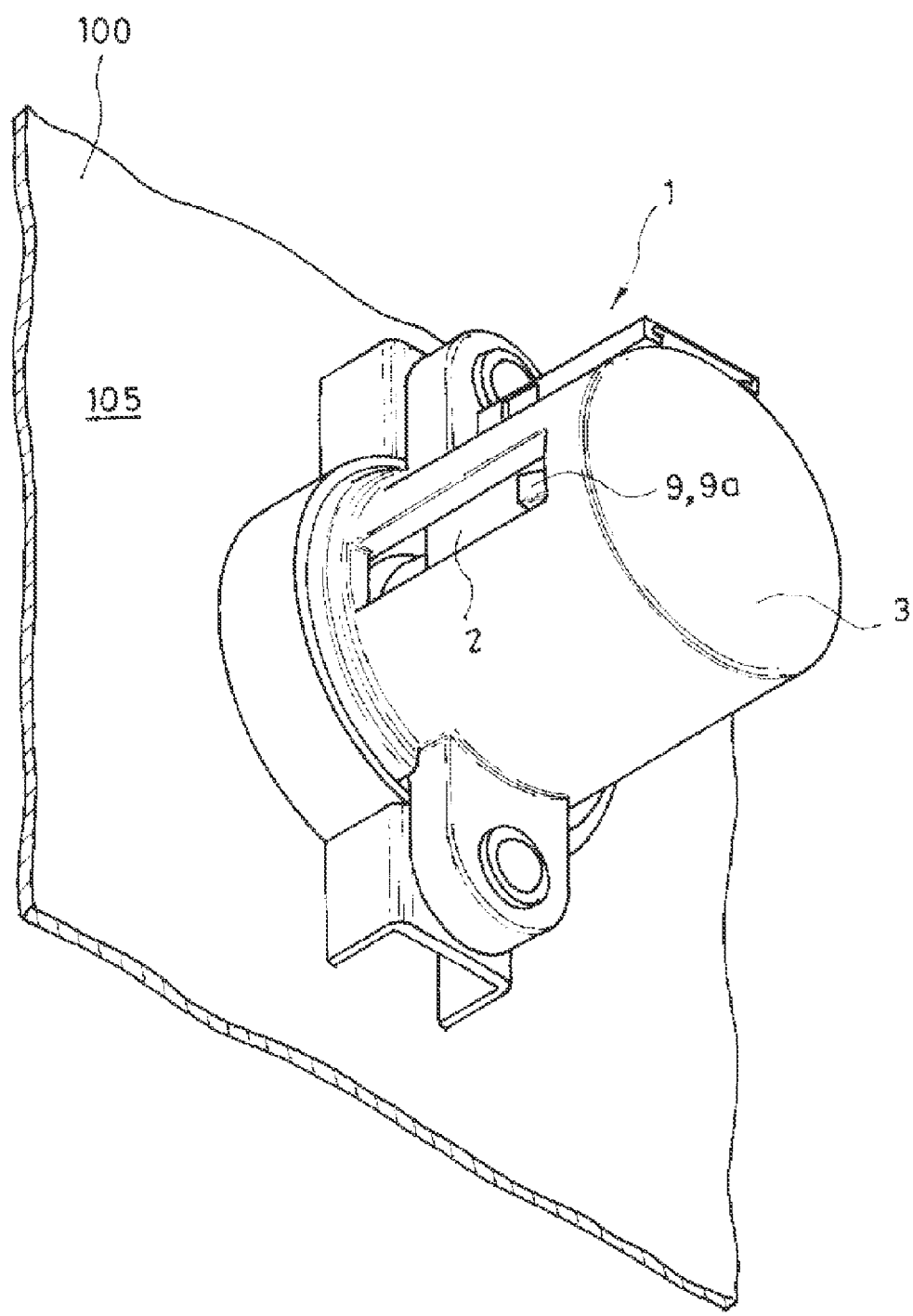
FIG. 6 is a perspective view of a support device illustrating the first example in the use condition, with the movable body at the retracted position, viewed from the inner side of the target object.

When the movable body 2 is at the retracted position, the front end 6 of the movable body 2 is at a position on the inner side of the design surface 103 around the pass-through hole 104, whereby forming the recess 102 on the target object 100 (FIG. 5).

A part of the support device 1 other than the front end 6 of the movable body 2 is positioned substantially on the side of a non-design surface that is on the opposite side of the design surface 103 of the target object 100, that is, inside 105 of the target object 100.

With the support device 1 provided to the cabin Ma of the vehicle M, a shopping bag or the like can be hung directly on the wall of the cabin Ma, using the projection 101 formed by the support device 1. It is also possible to hang various types of articles indirectly on the wall via a hanger or a S-shaped hook.

Figure 22:
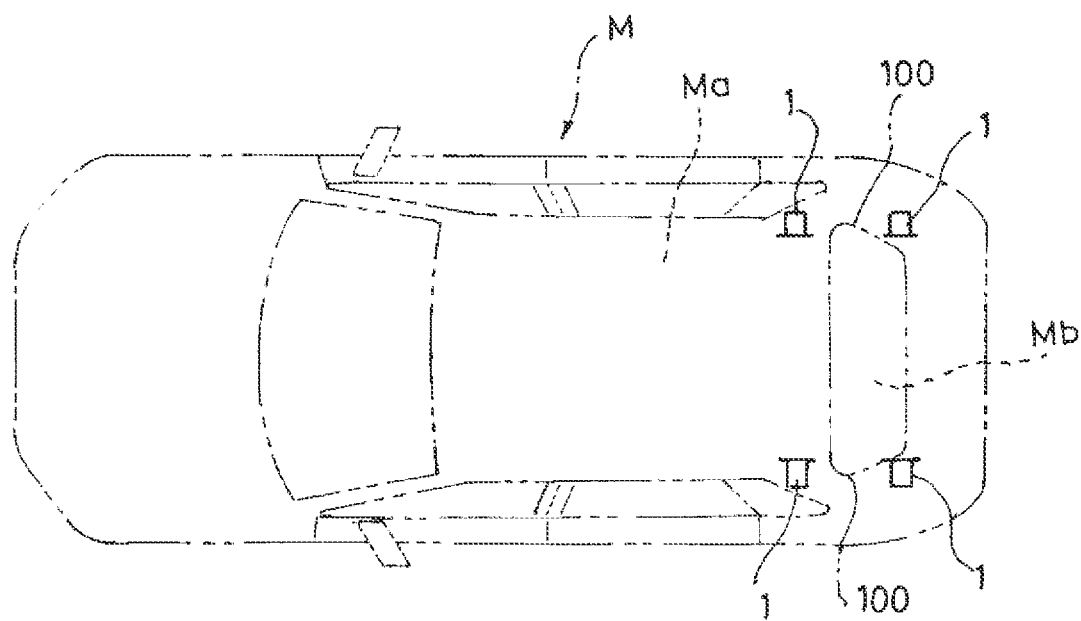
FIG. 22 is a plan view of a configuration of a vehicle, illustrating one example of the support device according to the first or the second example in the use condition.

Furthermore, with support devices 1 provided on the left wall and the right wall inside the cabin Ma, respectively, as illustrated in FIG. 22, a shelf-like body can be supported inside the cabin Ma, using the projections 101 formed by the respective support devices 1 provided on the left wall and the right wall, respectively.

Furthermore, using the recess 102 formed by the support device 1, it is also possible to assemble a part of various kinds of articles to the wall, by fitting or inserting the articles into the recess 102.

Figure 23:
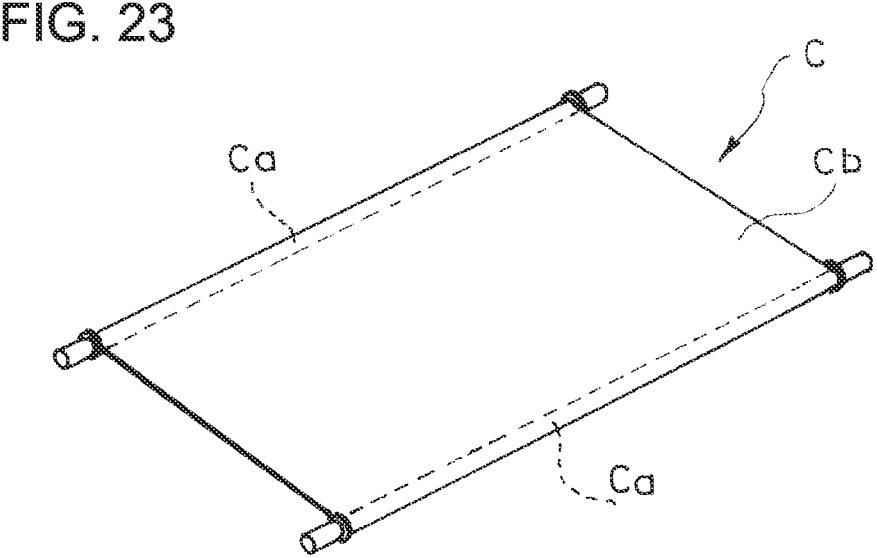
FIG. 23 is a perspective view of an article illustrating one example in which the article is supported by the support device according to the use condition illustrated in FIG. 22.

Furthermore, with the support devices 1 provided on the left wall and the right wall inside the cabin Ma, respectively, as illustrated in FIG. 22, a rod-like body Ca can be supported in a bridge-like fashion inside the cabin Ma, as illustrated in FIG. 23, using the recesses 102 formed by the respective support devices 1 provided on the left wall and the right wall, respectively.

In particular, by providing a plurality of the support devices 1 to each of the left wall and the right wall of the cabin Ma at a plurality of respective positions that are spaced apart in the front-back direction, as illustrated in FIG. 22, and by allowing the recesses 102 of the respective support devices 1 at substantially the same position in the front-back direction of the vehicle M to hold the respective ends of a rod-like body Ca, two rod-like bodies Ca, for example, can be supported in a bridge-like fashion in a manner spaced apart from each other in the front-back direction of the vehicle M. With a tonneau cover C with a screen-like cover Cb having one end fixed to one of the two rod-like bodies Ca and the other end fixed to the other one of the two rod-like bodies Ca, as illustrated in FIG. 23, by providing a plurality of the support devices 1 to each of the left wall and the right wall of the cabin Ma, in a manner spaced apart from each other in the front-back direction, the two rod-like bodies Ca can be supported in a bridge-like fashion, and to favorably cover the floor of the luggage space in the cabin Ma, with the screen-like cover Cb stretched across the floor.

Figure 7:
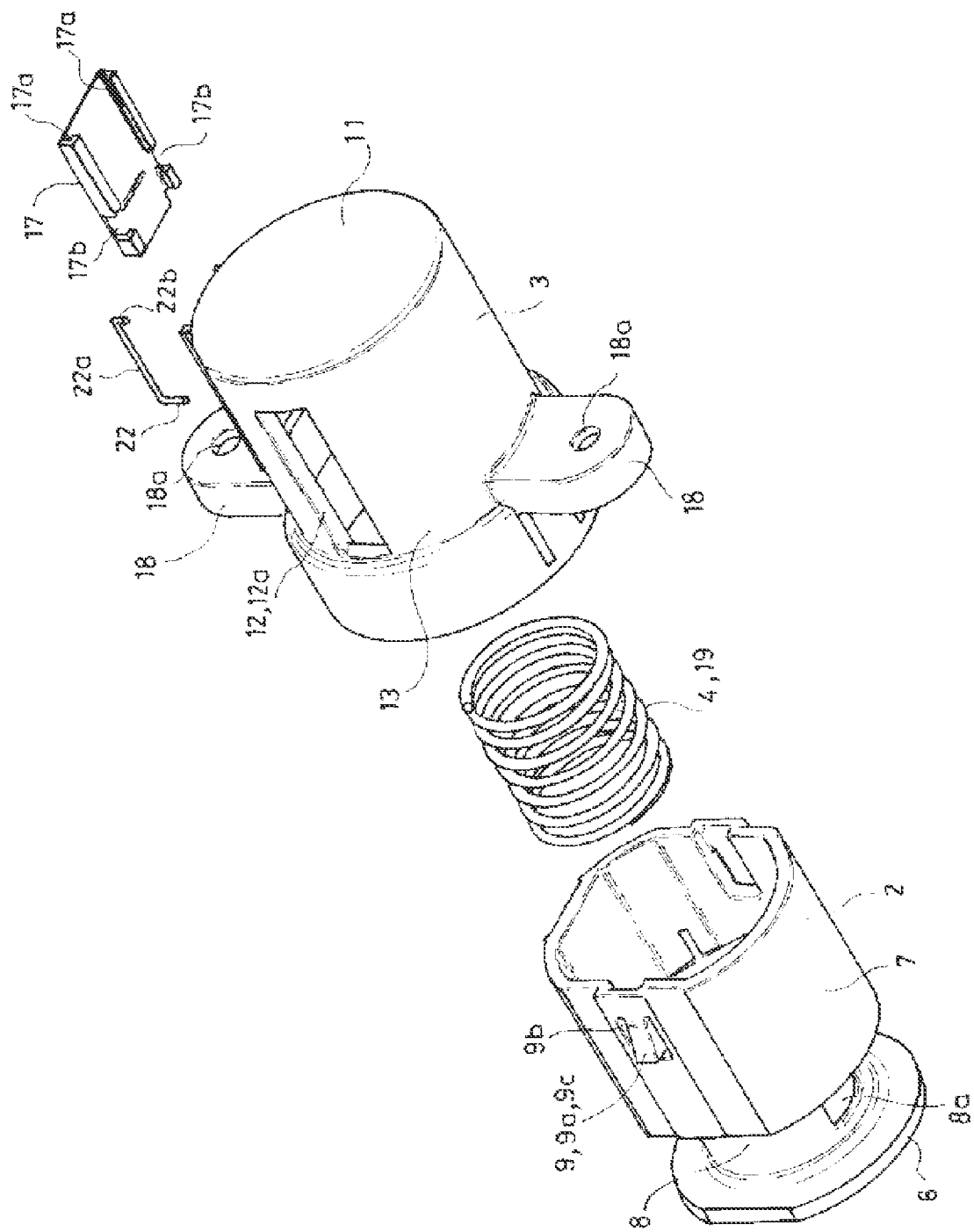
FIG. 7 is an exploded perspective view of members included in the first example.
Figure 8:
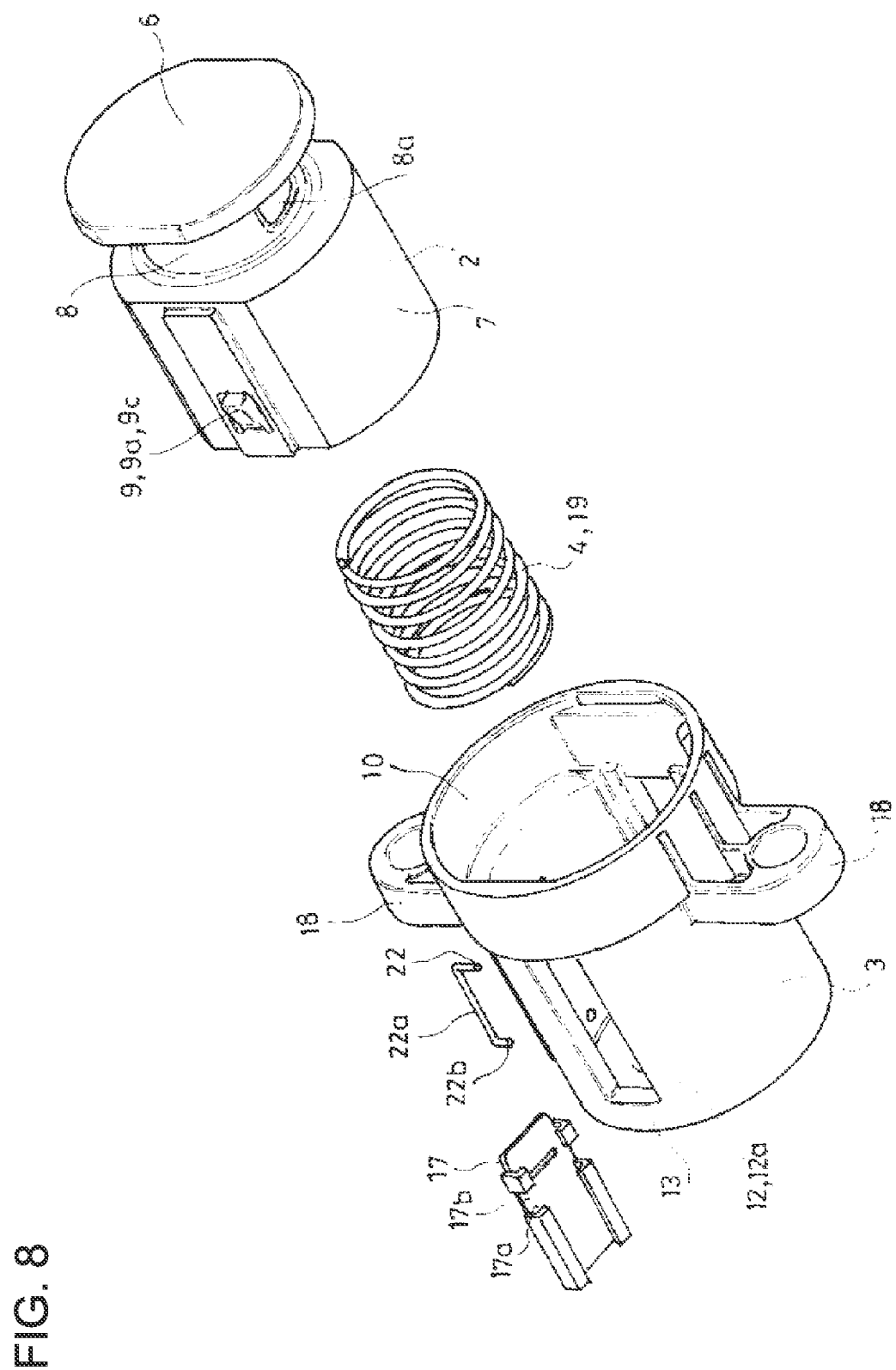
FIG. 8 is an exploded perspective view of the members included in the first example, viewed from a direction different from that in FIG. 7.
Figure 9:
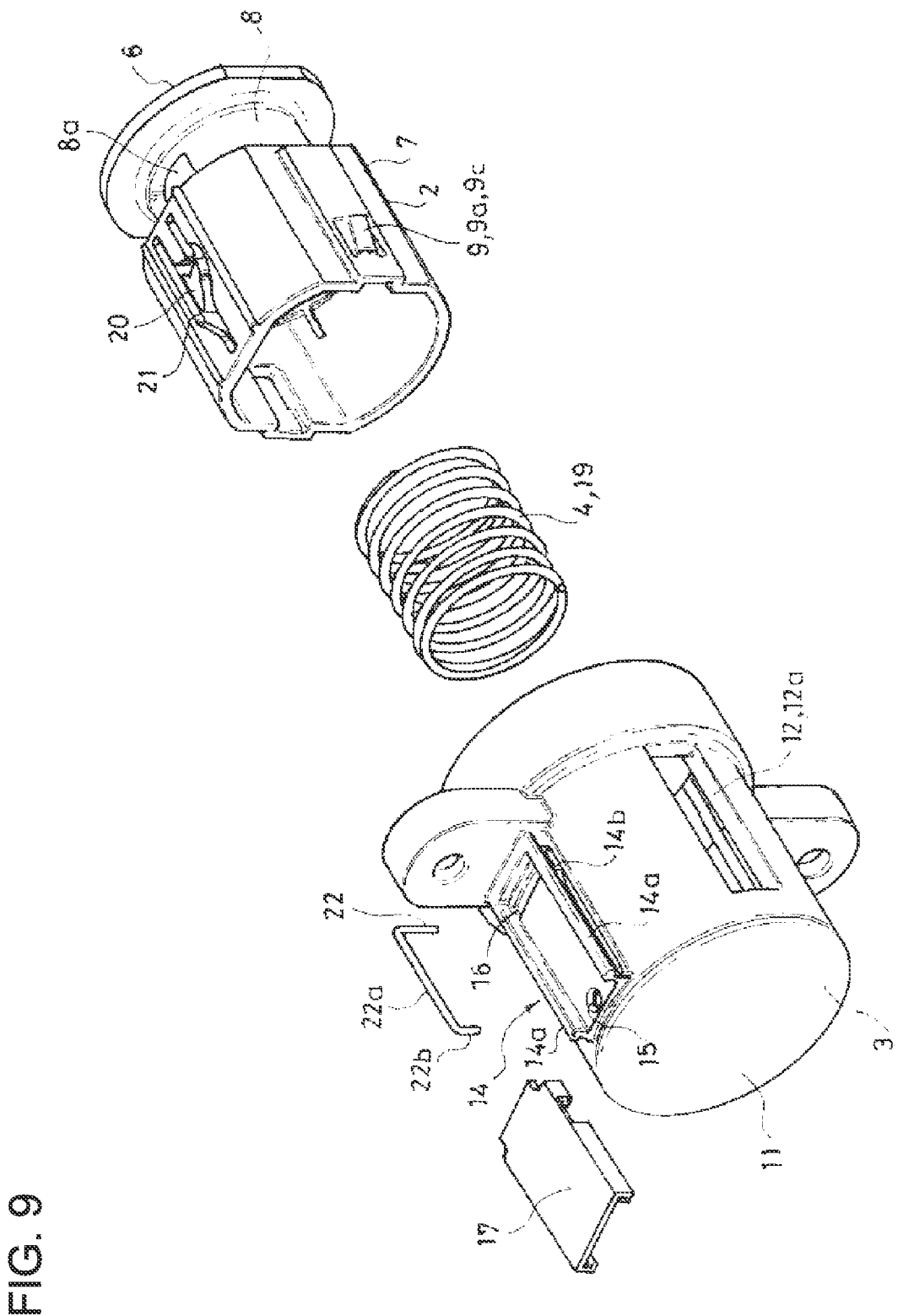
FIG. 9 is an exploded perspective view of the members included in the first example, viewed from a direction different from those in FIGS. 7 and 8.
Figure 10:
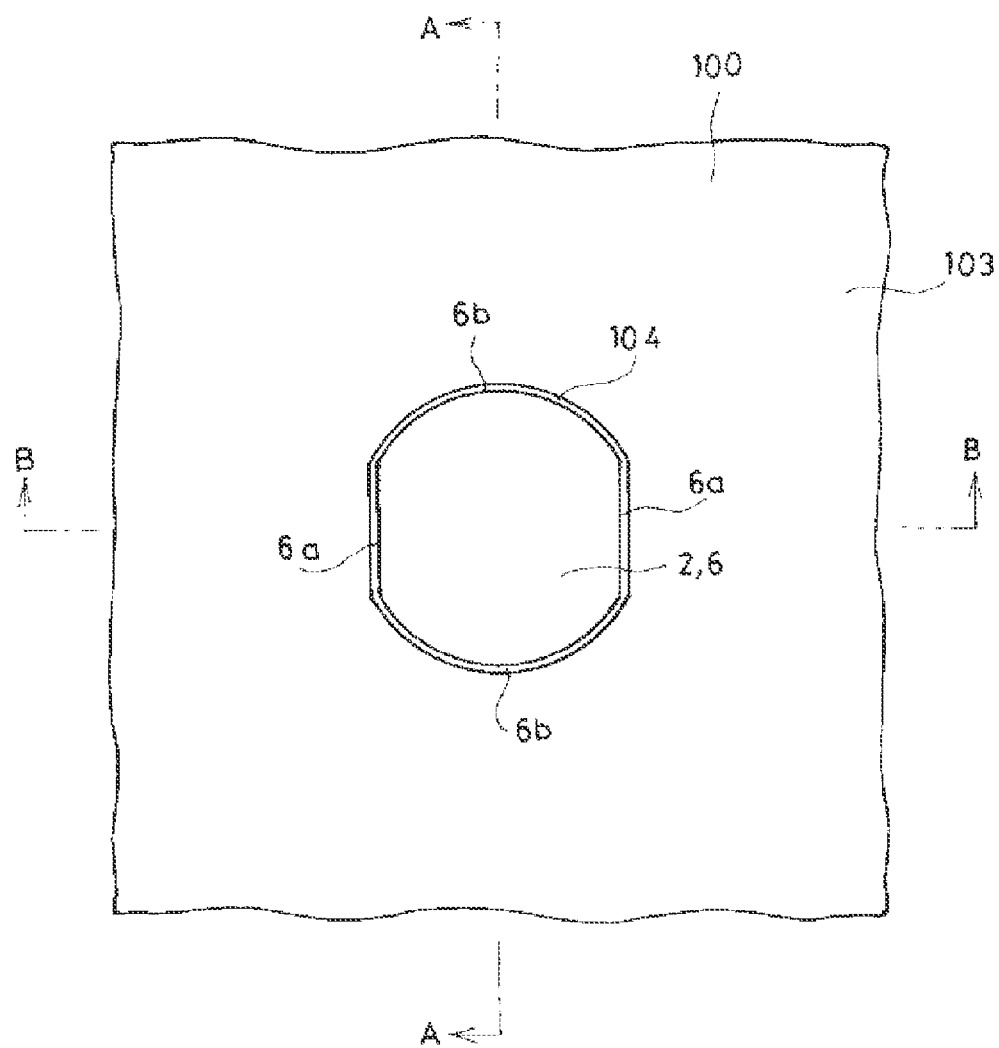
FIG. 10 is a front view of the support device illustrating the first example in the use condition, with the movable body at the reference position, viewed from the outer side of the target object.

The movable body 2 includes the front end 6 having a plate-like shape, a trunk 7 that is tubular, and a neck 8 extending between the front end 6 and the trunk 7 (see FIGS. 7 to 9).

The front end 6 has a plate-like shape having a plate surface intersecting perpendicularly with a central axis x (see FIG. 11) that extends along the direction of the movement of the movable body 2. In the example illustrated, the front end 6 has a form that includes left and right linear edges 6a along a virtual line perpendicular to the central axis x and upper and lower arcuate edges 6b along arcs of a virtual circle having the center at the central axis x (see FIG. 11). At the retracted position, the front end 6 substantially closes the pass-through hole 104 of the target object 100 having a matching contour with the front end 6, and the surface of the front end 6 on the opposite side of the neck 8 comes in flush with the design surface 103 around the pass-through hole 104 (FIG. 1).

The neck 8 and the trunk 7 together form a hollow tubular body (see FIGS. 7 to 9 and 11). This tubular body has a front end that is closed by the front end 6, and a rear end that is open. The external diameter of the trunk 7 is substantially equal to the external diameter of the virtual circle along which the arcuate edges 6b of the front end 6 extend. The external diameter of the neck 8 is smaller than the external diameter of the trunk 7. In the example illustrated, at the advanced position, a front part of the movable body 2 outward the neck 8 sticks out from the design surface 103 to form the projection 101. Onto the projection 101 thus formed, handles of a shopping bag or the like can be hung on the neck 8, which is on the rear side of the front end 6, with the front end 6 preventing the shopping bag from falling off.

In the example illustrated, rectangular windows 8a are provided on an upper part and a lower part of the neck 8, respectively. These windows 8a may be used for passing a string or the like through the projection 101.

On the trunk 7, an elastic piece 9a is formed each on its left and right sides on a part adjacent to the rear end of the trunk 7, the elastic pieces 9a serving as engaging portions 9 (described below). Each of the elastic pieces 9a is formed as a part of the trunk 7, the elastic piece 9a being delineated by a split groove 9b. The split groove 9b includes an upper groove and a lower groove extending along the central axis x, and a vertical groove connecting the front ends of the upper groove and the lower groove. Each of the elastic pieces 9a has a catch 9c provided on the outer surface.

Figure 16A:
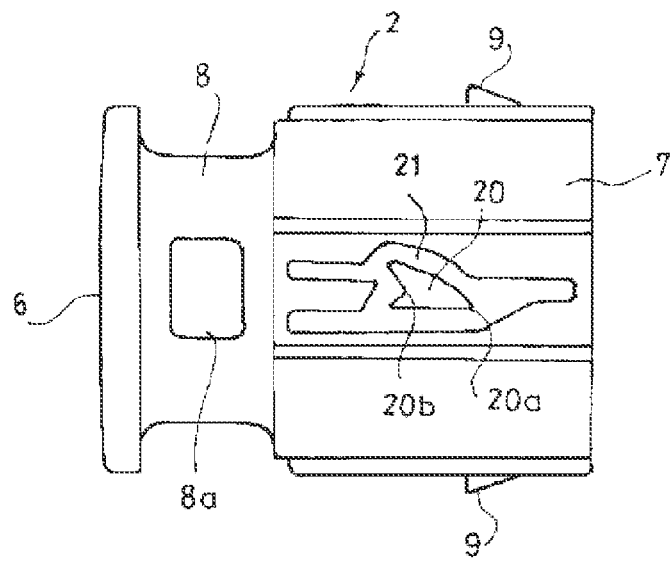
FIG. 16A is a plan view of the movable body.

The trunk 7 is provided with a heart cam 20, which is a part of the control mechanism 5 to be described later, on an upper part of the trunk 7 (see FIGS. 9, and 16A and 16B). The heart cam 20 forms a part of the trunk 7, the part being an island-like part remaining after forming an encircling guide groove 21 in a manner engraved into the outer surface of the trunk 7. The heart cam 20 has a pointed portion 20a that is on the rear side, and a recessed portion 20b that is on the front side (see FIGS. 16A and 16B).

The guide groove 21 is provided to the trunk 7 across a range between a part adjacent to the front end and a part adjacent to the rear end of the trunk 7. The guide groove 21 includes an encircling portion 21a encircling the heart cam 20; a first lane 21b extending frontwards from one side of the encircling portion 21a, the one side being one side with respect to the recessed portion 20b of the heart cam 20 (one side with respect to a virtual line y, illustrated in FIG. 16B, extending along the direction of the movement of the movable body 2 and passing through the recessed portion 20b; on the upper side in FIG. 16B); a second lane 21c extending frontwards from the other side of the encircling portion 21a, the other side being the other side with respect to the recessed portion 20b of the heart cam 20 (the other side with respect to the virtual line y; on the lower side in FIG. 16B); and a third lane 21d extending from the encircling portion 21a rearwards along the line y, on the rear side of the pointed portion 20a of the heart cam 20.

In the encircling portion 21a, the groove wall in front of the recessed portion 20b of the heart cam 20 serves as a first guide wall 21e for guiding a pin 22, to be described later, at the recessed portion 20b of the heart cam 20 (at the position of the reference sign "a" indicated in FIG. 16B) into the second lane 21c, when first pushing, to be described later, is exerted on the movable body 2, while the pin 22 is kept engaged with the recessed portion 20b by the biasing force of the biasing body 4.

An upwardly directed part of the heart cam 20 between the pointed portion 20a and the recessed portion 20b in FIG. 16B serves as a second guide wall 21f for guiding the pin 22 at the rear end of the third lane 21d (at the position of the reference sign c indicated in FIG. 16B) toward the upper side of the heart cam 20 in FIG. 16B (toward the one side with respect to line y) when second pushing, to be described later, is exerted on the movable body 2.

Figure 16B:
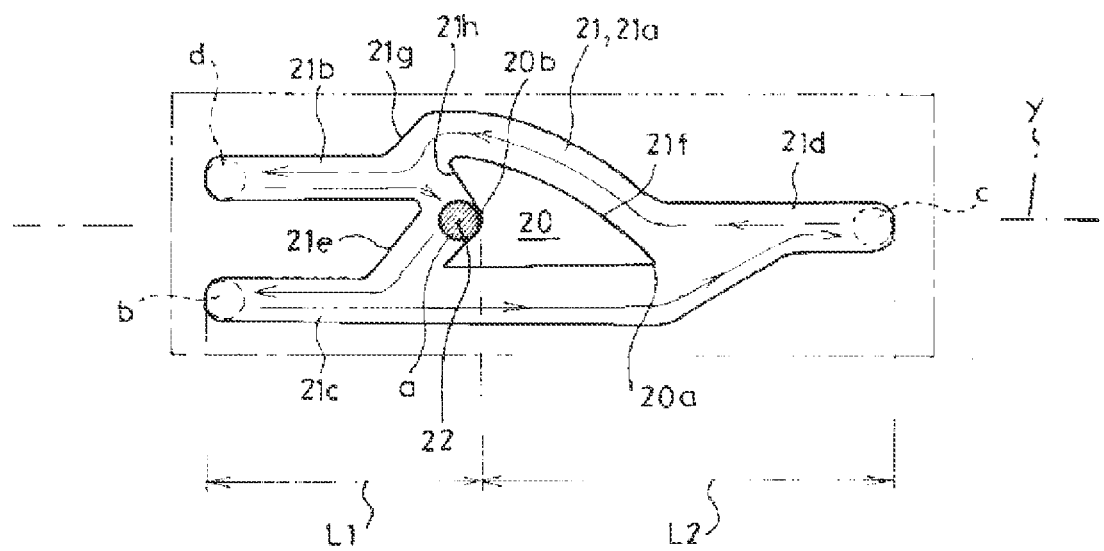
FIG. 16B is an enlarged view of a main portion of the movable body, wherein in the enlarged view of the main portion, the solid line indicates a pin when the movable body is at the reference position, and the dotted line indicates the pin when the movable body is at the other positions, for convenience.
Figure 17:
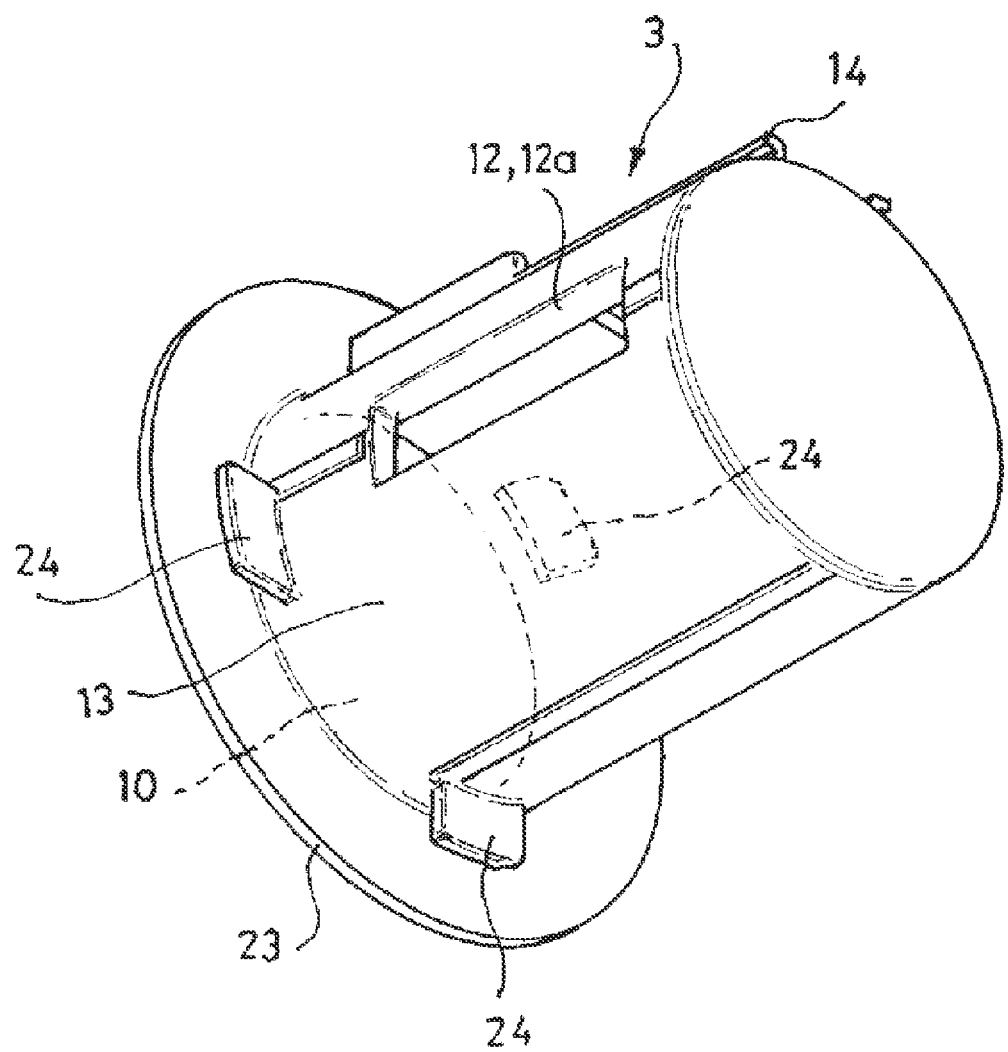
FIG. 17 is a perspective view of a casing body included in a support device (second example), viewed from the rear, according to one embodiment of the present invention.

In the encircling portion 21a, the groove wall disposed above the first guide wall 21e in FIG. 16B (on the one side with respect to the line y) serves as a third guide wall 21g for guiding the pin 22 having been guided to the upper side of the heart cam 20 in FIG. 16B by the second pushing, into the first lane 21b.

The part of the heart cam 20 above the recessed portion 20b in FIG. 16B (on the one side with respect to the line y) and facing the entryway of the first lane 21b serves as a fourth guide wall 21h for guiding the pin 22 into the recessed portion 20b of the heart cam 20 when the movable body 2 is moved to the reference position by the biasing force of the biasing body 4 after the second pushing is ended.

In the example illustrated, the distance L2 between the recessed portion 20b of the heart cam 20 and the rear end of the third lane 21d is slightly greater than the distance L1 between the recessed portion 20b of the heart cam 20 and the front ends of the first lane 21b and the second lane 21c (FIG. 16B). With this, in this embodiment, the distance by which the movable body 2 moves from the reference position to the advanced position is slightly larger than the distance by which the movable body 2 moves from the reference position to the retracted position.

In the example illustrated, the trunk 7 also has an encircling stepped surface 7a facing rearwards, on the inner side of the trunk 7, the encircling stepped surface 7a being provided to a part adjacent to the front end of the trunk 7 (FIG. 11). In the example illustrated, the front end of a compressed coil spring 19, which will be described later, that is the biasing body 4 comes into abutment against the encircling stepped surface 7a.

The casing body 3 has an inner diameter substantially equal to the outer diameters of the front end 6 of the movable body 2 and of the trunk 7, and has a cylindrical shape having an open cylindrical front end that is opened as a projection opening 10 for the movable body 2, and having a closed rear end (see FIGS. 8 and 9).

The casing body 3 has an engaging counterpart 12 to be engaged with an engaging portion 9 provided to the movable body 2 (see FIGS. 7 to 9). In the example illustrated, such an engaging counterpart 12 is provided as an elongated guide hole 12a extending along the direction of the movement of the movable body 2. The elongated guide hole 12a is provided to each of the left and the right sides of the casing body 3, correspondingly to each of the left and the right elastic pieces 9a serving as the engaging portion 9 of the movable body 2. In the example illustrated, the elongated guide hole 12a is a slot provided as a cutout on the side surface of the casing body 3.

The distance between the tip of the catch 9c on the left elastic piece 9a of the movable body 2 and the tip of the catch 9c on the right elastic piece 9a that are the engaging portion 9 is slightly larger than the inner diameter of the casing body 3. With this, when the rear end of the movable body 2 is inserted into the casing body 3 through the projection opening 10, the catches 9c of the respective elastic pieces 9a are brought into contact with the rim of the projection opening 10 of the casing body 3, and the elastic pieces 9a elastically deform toward the central axis x. This elastic deformation enables the insertion of the movable body 2 into the casing body 3. Once the movable body 2 reaches a predetermined insertion position, that is, in the example illustrated, to a position where the catches 9c of the respective elastic pieces 9a reach the front ends of the elongated guide holes 12a, respectively, inside the casing body 3, the catches 9c are caused to enter the respective elongated guide holes 12a, by the elastic recovery of the elastic pieces 9a. As a result, the movable body 2 is assembled with the casing body 3, without the movable body 2 sticking out any further from the advanced position. The movement of the movable body 2 is stably supported by these elongated guide holes 12a.

The movable body 2 and the casing body 3 can be assembled in the same manner by providing the movable body 2 with the elongated guide holes 12a and providing the casing body 3 with the elastic pieces 9a (with the catches 9c protruding toward the central axis x), although such a configuration is not illustrated.

On the upper side of the casing body 3, a support 14 for the pin 22, which is a part of the control mechanism 5 to be described later, is provided (see FIG. 9). In the example illustrated, one end of a metal wire 22a having both ends bent to the same direction is used as the pin 22. A shaft hole 15 into which the other end 22b of the metal wire 22a can be inserted from the outside of the casing body 3 is provided to the casing body 3, on a part adjacent to the rear end of the casing body 3. The casing body 3 has a split groove 16 on a part adjacent to the front end of the casing body 3, the split groove 16 being a groove for receiving the pin 22 into the casing body 3 from the outside of the casing body 3, with the other end of the metal wire 22a inserted in the shaft hole 15 (see FIG. 15). The split groove 16 is provided in a manner following the arc of a virtual circle centered at the shaft hole 15. With this, the pin 22 can be assembled movably to the casing body 3 centered at the shaft hole 15, in the right-and-left direction, within the range provided with the split groove.

Figure 2:
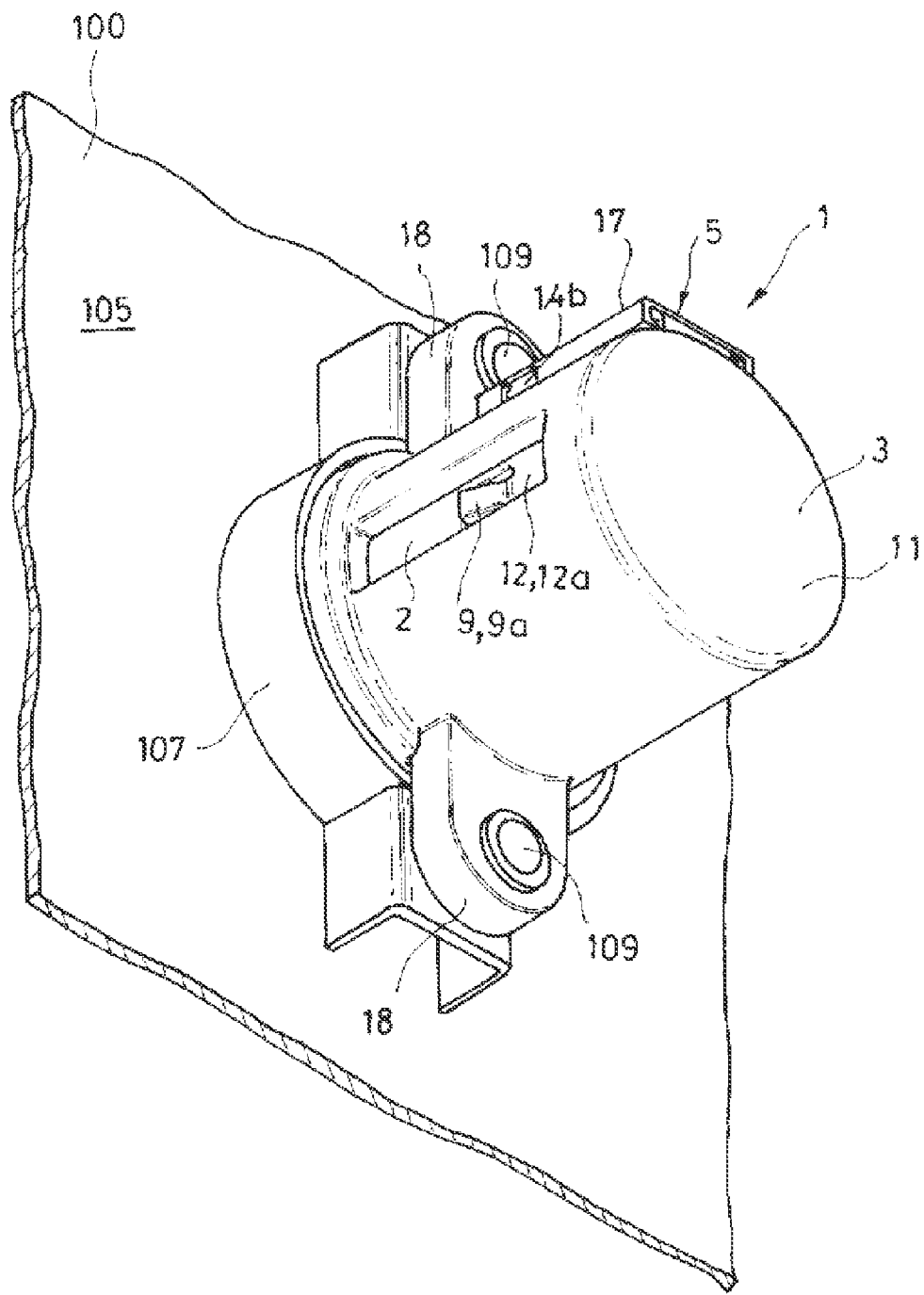
FIG. 2 is a perspective view of the support device illustrating the first example in the use condition, with the movable body at the reference position, viewed from the inner side of the target object.

In FIGS. 7 to 9, the reference sign 17 indicates a cover that is to be assembled to the support 14 in such a manner that the metal wire 22a assembled to the casing body 3 as described above is prevented from falling off. The cover 17 has grooves 17a each on the left and right sides (see FIG. 9) and is configured to be assembled into the casing body 3 in a manner that each of the grooves 17a receives an elongated protrusion 14a, which is formed each on the left and right sides of the support 14, projects in a lateral direction, and extends in the front-back direction. In the cover 17, each of the parts provided with the respective grooves 17a has a discontinuous portion separating the part into a front part and a rear part. As the cover 17 is moved slidingly from the rear end of the casing body 3, to fit the elongated protrusions 14a into the respective grooves 17a, small protrusions 14b provided on the support 14 fit into respective discontinuous portions 17b, thereby securing the position where the cover 17 is attached to the casing body 3 (FIG. 2).

Figure 14:
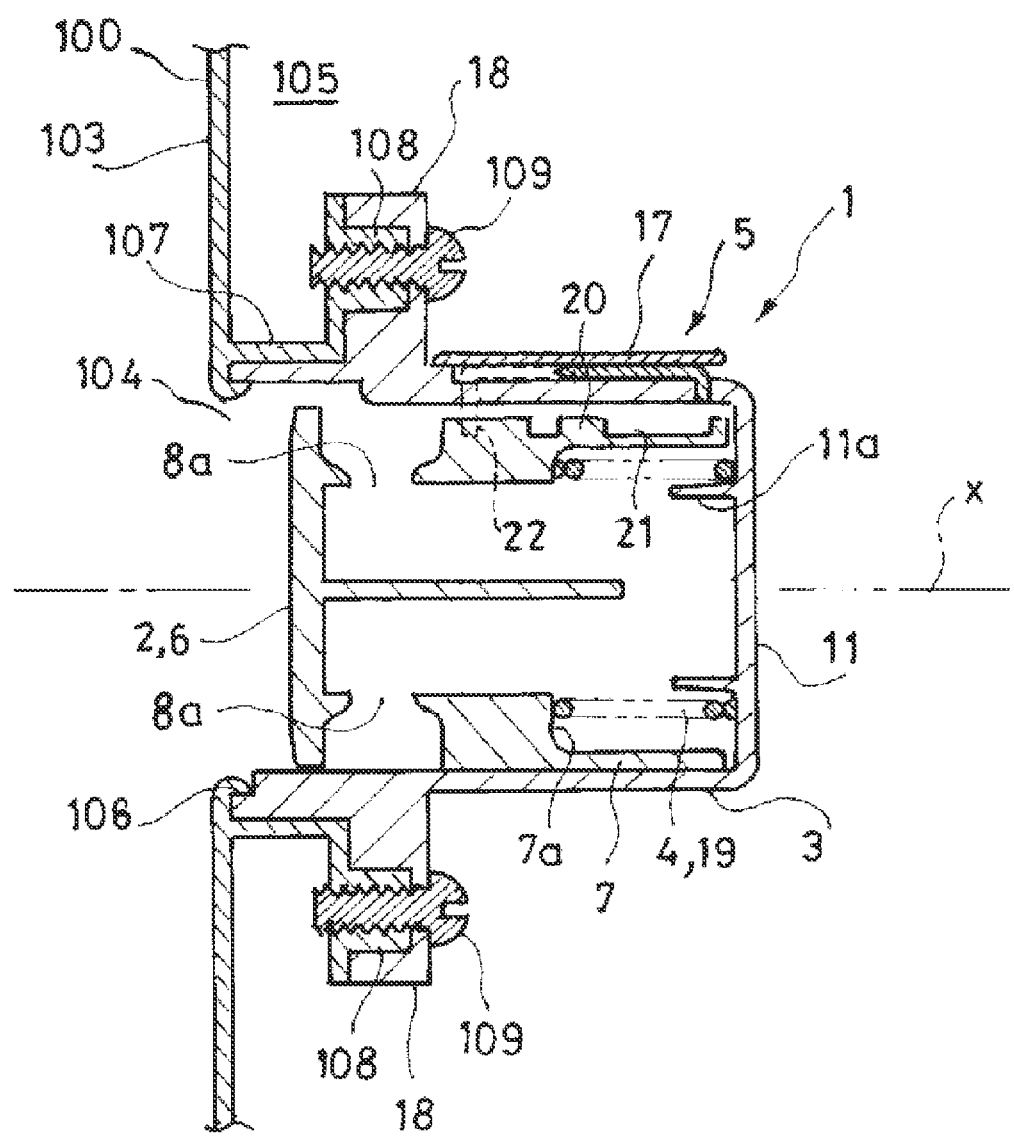
FIG. 14 is a sectional end view of the support device cut along the line A-A, with the movable body at the retracted position.
Figure 15:
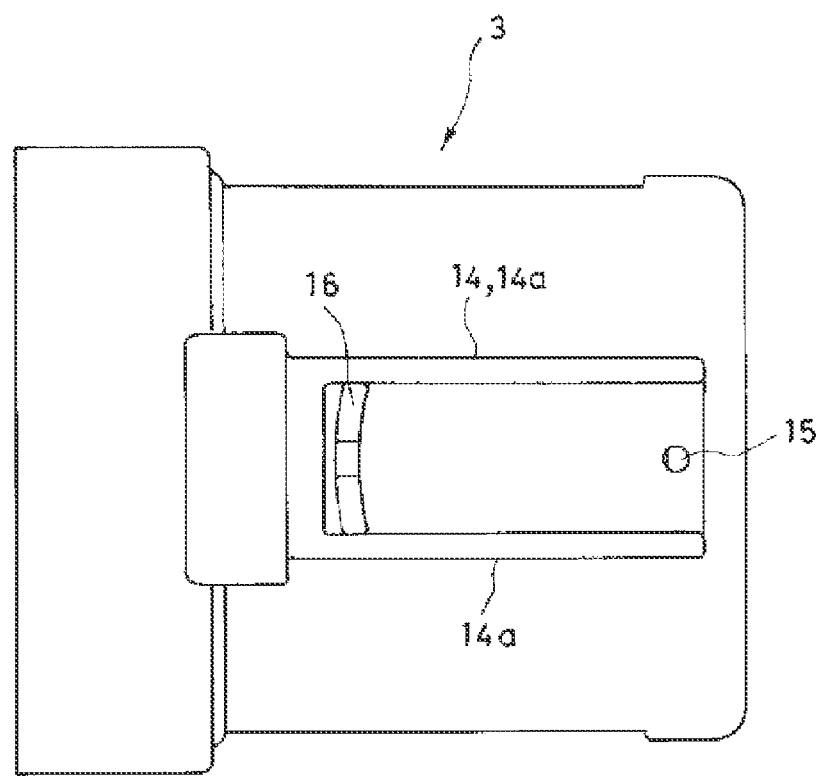
FIG. 15 is a plan view of a casing body according to the first example.

The biasing body 4 may have any configuration for exerting a constant biasing force to the movable body 2 in the direction toward the advanced position, and a specific configuration of the biasing body 4 may be selected appropriately, as required. In the example illustrated, the biasing body 4 is a compressed coil spring 19 disposed between the movable body 2 and the casing body 3. The rear end of this compressed coil spring 19 is in abutment against the closed rear end 11 of the casing body 3. In FIGS. 11, 13 and 14, the reference sign 11*a* indicates an aligning portion for aligning the tubular compressed coil spring 19. The aligning portion 1 *la* is provided to the rear end 11 in a manner protruding forwards, and inserted into the compressed coil spring 19.

The support device 1 according to this embodiment is put together by disposing the compressed coil spring 19 between the casing body 3 and the movable body 2; by inserting the movable body 2, from the side of the trunk 7, into the casing body 3 through the projection opening 10 of the casing body 3, to the position where the engaging portions 9 become engaged with the respective engaging counterparts 12; and by inserting the pin 22, which is a part of the control mechanism 5, into the guide groove 21, which is also a part of the control mechanism 5, provided on the trunk 7 of the movable body 2.

Such a control mechanism 5 performs a cycle of controlling the movable body 2, the cycle including temporal holding of the movable body 2 at the reference position; first pushing of the movable body 2 at the reference position toward the retracted position against the biasing force; causing the biasing force to move the movable body 2 after the first pushing, to the advanced position; second pushing of the movable body 2 at the advanced position against the biasing force; and causing the biasing force to move the movable body 2 after the second pushing, to the reference position.

While the support device 1 is not in use, the movable body 2 temporarily held at the reference position is allowed to form a part of the design surface 103 of the target object 100 (FIG. 1). In this manner, the support device 1 is prevented from disturbing the design of the target object 100 while the support device 1 is not in use.

Furthermore, with the first pushing, the movable body 2 having been temporarily held can be released and moved to the retracted position (FIG. 5). As a result, the recess 102 is formed on the target object 100, advantageously, usable for purposes such as fitting.

Furthermore, by releasing the first pushing, the movable body 2 can be moved to the advanced position (FIG. 3). As a result, the projection 101 is formed on the target object 100, advantageously, usable for purposes such as hooking.

Furthermore, with the second pushing, the movable body 2 at the advanced position can be moved to the retracted position. As a result, the recess 102 is formed on the target object 100 again, advantageously, usable for purposes such as fitting.

Furthermore, by releasing the second pushing, the movable body 2 can be moved to the reference position. As a result, the configuration in which the movable body 2 forms a part of the design surface 103 of the target object 100 is recovered, advantageously.

In the example illustrated, when the movable body 2 is at the reference position, the pin 22 is kept inside the recessed portion 20*b* of the heart cam 20, with the biasing force of the compressed coil spring 19, and the movable body 2 is temporarily held at the reference position (the pin 22 is at the position "a" in FIG. 14).

Once the first pushing is exerted on the movable body 2 at the reference position, the pin 22 comes into abutment against the first guide wall 21*e* of the encircling portion 21*a* of the guide groove 21, and the pin 22 is guided into the second lane 21*c*. Once the pin 22 is guided into the second lane 21*c*, a relative movement of the pin 22 up to the front end of the second lane 21*c* is permitted, and, as a result, the movable body 2 is moved to the retracted position (the pin 22 being at the position indicated by the reference sign "b" in FIG. 16B).

Once the first pushing of the movable body 2 is released, the biasing force of the compressed coil spring 19 starts causing the movable body 2 to move forwards, to guide the pin 22 into the third lane 21*d* via the lower part of the heart cam 20. Once the pin 22 is guided into the third lane 21*d*, a relative movement of the pin 22 up to the rear end of the third lane 21*d* is permitted, and as a result, the movable body 2 is moved to the advanced position (the pin 22 being at the position indicated by the reference sign c in FIG. 16B).

Once the second pushing is exerted on the movable body 2 at the advanced position, the pin 22 is brought into abutment against the second guide wall 21*f* and guided into the part of the encircling portion 21*a* above the heart cam 20, and the pin 22 is further guided into the first lane 21*b* by the third guide wall 21*g*. Once the pin 22 is guided into the first lane 21*b*, a relative movement of the pin 22 up to the front end of the first lane 21*b* is permitted, and as a result, the movable body 2 is moved to the retracted position again (the pin 22 being at the position indicated by the reference sign "d" in FIG. 16B).

Once the second pushing of the movable body 2 is released, the biasing force of the compressed coil spring 19 starts causing the movable body 2 to move forwards, and the pin 22 is brought into abutment against the fourth guide wall 21*h*, and guided into the recessed portion 20*b* of the heart cam 20. As a result, the movable body 2 is temporarily held at the reference position (the pin 22 being at the position indicated by the reference sign "a" in FIG. 16B).

Although not illustrated, the operation of the movable body 2 can also be controlled in the same way as described above by providing the pin 22 as described above to the movable body 2, and by providing the casing body 3 with the heart cam 20 as described above.

The first example illustrated in FIGS. 1 to 16B has a configuration in which the casing body 3 is assembled and fixed to the target object 100 in such a manner that the projection opening 10 communicates with the pass-through hole 104 of the target object 100, on the non-design surface inside 105 of the target object 100.

In this first example, the top and bottom of the front end of the casing body 3 are each provided with an ear 18 that sticks out orthogonally to the side 13 of the casing body 3 (see FIG. 2).

In this first example, the non-design surface of the target object 100 has an inner encircling wall 106 covering the rim of the pass-through hole 104 and an outer encircling wall 107 with an encircling gap ensured with respect to the inner encircling wall 106, the gap being ensured for housing the front end of the casing body 3. Bosses 108 are provided above and below the outer encircling wall 107, respectively, so as to enter holes 18*a* from the front, respectively, the holes 18*a* passing through the respective tabs 18 in the front-back direction (see FIG. 11). In the first example, the support device 1 is attached to the target object 100 via the casing body 3 by fastening a screw from the rear side of each of the bosses 108, with the boss 108 inserted into the hole of the corresponding tab 18. In this example, the part of the movable body 2 adjacent to the front end is positioned inside the inner encircling wall 106 and closes the pass-through hole 104 of the target object 100 at the reference position without any gap therebetween (see FIG. 11).

In a second example illustrated in FIGS. 17 to 21, the casing body 3 has an outer collar 23 along the projection opening 10 and at least one projecting piece 24 projecting outwards behind the outer collar 23. The outer collar 23 is provided in a manner encircling the projection opening 10, and the outer collar 23 has such a size that the outer collar 23 does not pass through the pass-through hole 104 of the target object 100. The projecting piece 24 projects outward the side 13 of the casing body 3 with a space corresponding to the thickness of the target object 100 between the projecting piece 24 and the outer collar 23. In the example illustrated, three projecting pieces 24 are provided with a space therebetween in the direction encircling the projection opening 10 of the casing body 3.

Figure 18:
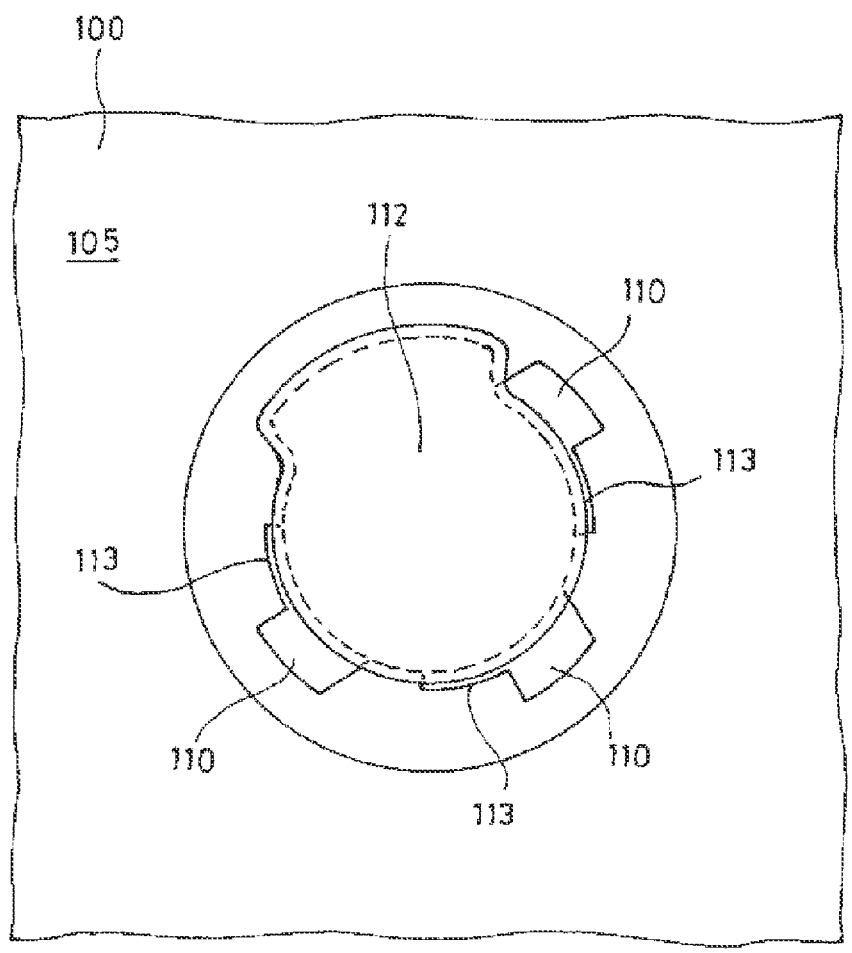
FIG. 18 is a rear view of a main portion of the target object to which the support device according to the second example is attached, viewed from the inner side.
Figure 19:
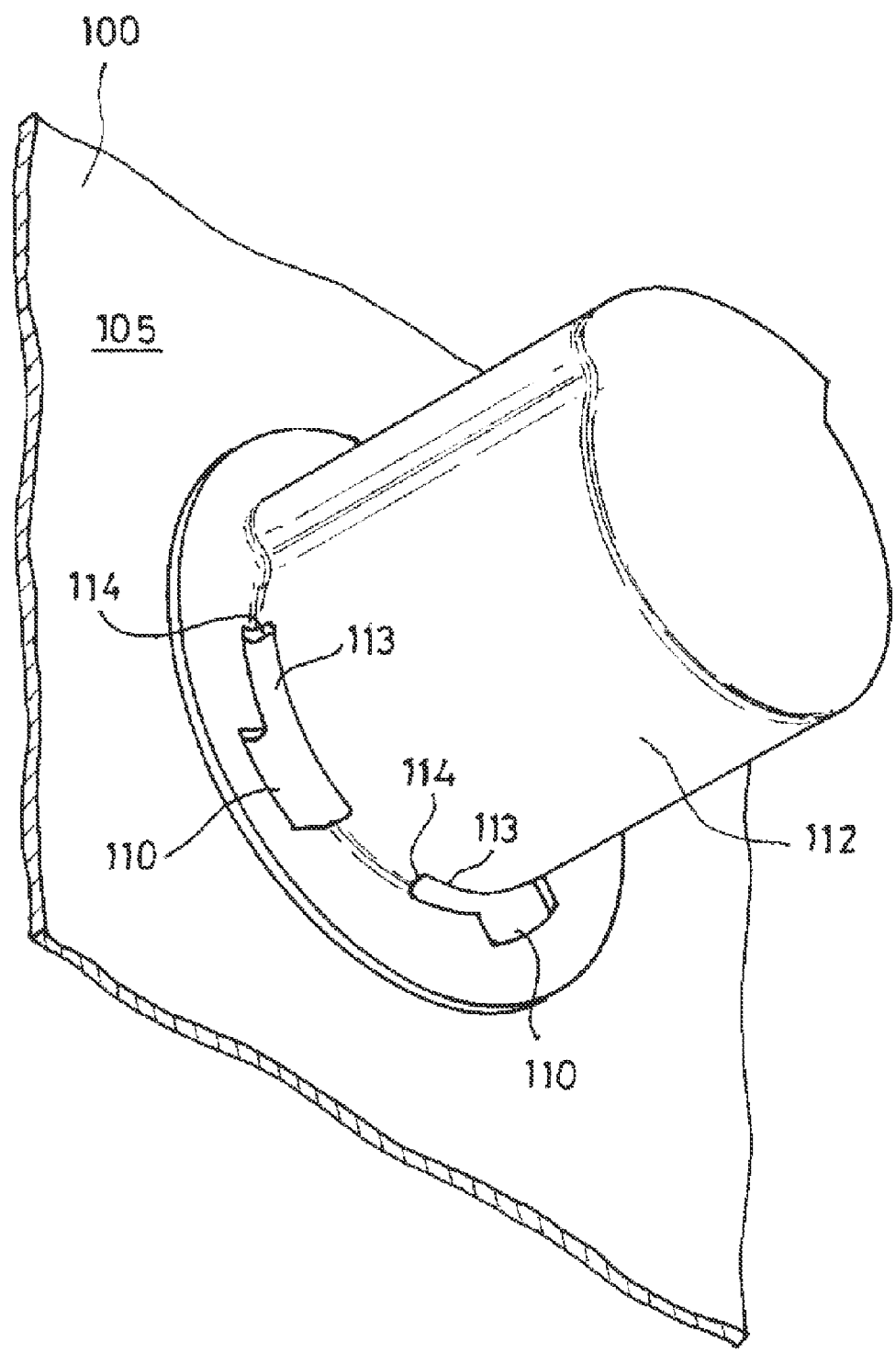
FIG. 19 is a perspective view of the main portion of the target object illustrated in FIG. 18, viewed from the inner side.

In this second example, cutouts 110 for passing the respective projecting pieces 24 are provided to the target object 100, in a manner continuous to the pass-through hole 104 on the target object 100. In this second example, the design surface 103 of the target object 100 has an encircling recess 111 encircling the pass-through hole 104. In addition, the encircling recess 111 has the three cutouts 110 for enabling entry of the respective three projecting pieces 24, the cutouts 110 being formed by cutting out the encircling recess 111 in the radial directions about the center of the pass-through hole 104 correspondingly to the respective three projecting pieces 24 with a space therebetween in the direction encircling about the center of the pass-through hole 104 (FIG. 18).

In this second example, the support device 1 is fixed to the target object 100 via the casing body 3 using the pass-through hole 104 and the cutouts 110, by inserting the part of the casing body 3 that is behind the outer collar 23 and includes the projecting pieces 24 into the target object 100, and turning the casing body 3 to nip or clamp the target object 100 between the outer collar 23 and the projecting pieces 24 from the outside and the inside, respectively.

Figure 21:
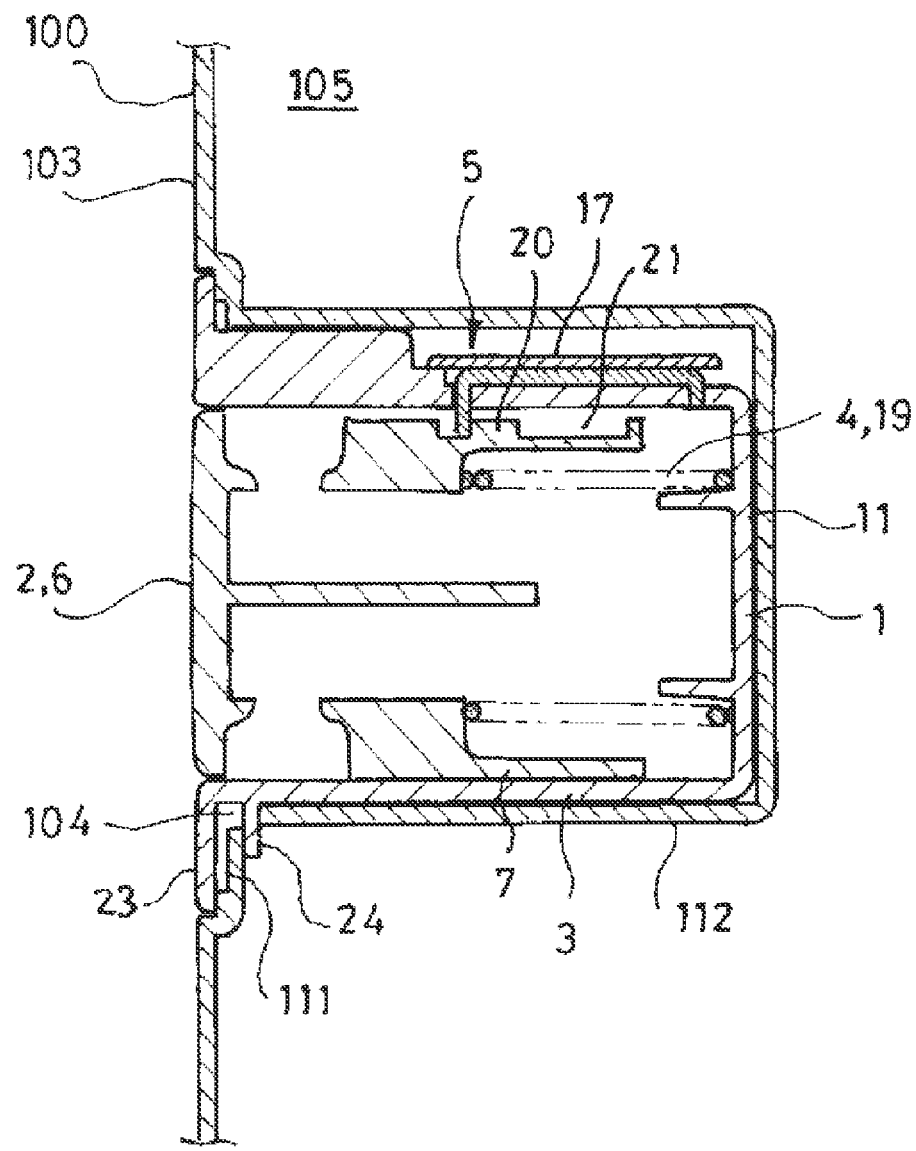
FIG. 21 is a sectional end view of the support device according to the second example in the use condition, with the movable body at the reference position.

In this second example, with the support device 1 thus fixed, the outer collar 23 of the casing body 3 fits into the encircling recess 111 of the target object 100, and comes in flush with the design surface 103 of the target object 100, thereby forming the design surface 103 of the target object 100 together with the front end 6 of the movable body 2 at the reference position (FIG. 21).

Figure 20:
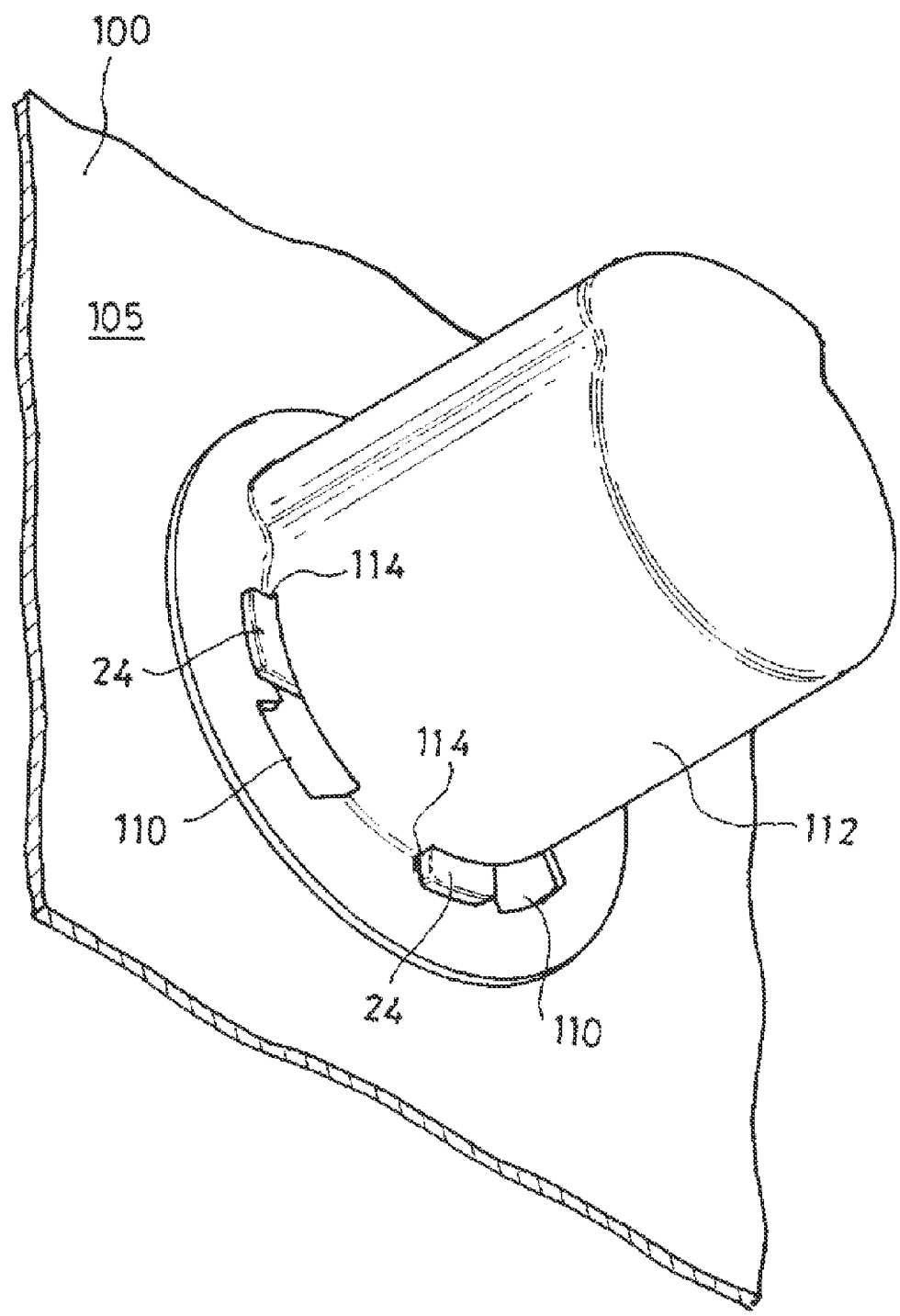
FIG. 20 is a perspective view of the support device according to the second example attached to the target object in the use condition, viewed from the inner side.

Furthermore, on the inward-facing surface of the target object 100, that is, on the non-design surface 105, a cylinder 112 having the tubular front end communicating with the pass-through hole 104 is provided, and the casing body 3 is fitted into this cylinder 112. The front end of the cylinder 112 has split grooves 113 each of which has one end communicating with the corresponding one of the cutouts 110 and extending in an encircling direction toward the side moving away from the corresponding cutout 110, so that the turning can be performed until the projecting pieces 24 come into abutment against terminating ends 114 of the split grooves 113, respectively (FIG. 20).

With the configuration according to the second example, the support device 1 can be attached to the target object 100 without using any special tools. Furthermore, the support device 1 can be easily removed from the design surface 103 of the target object 100 by holding and turning the front end 6 of the movable body 2 while the movable body 2 is at the advanced position.

The application of the elastically deforming property to the parts of the support device 1 described above that should have such a property can be easily ensured by making the entire or a part of the support device 1 an injection-molded plastic article.

Needlessly to say, the present invention is not limited to the embodiment described above and includes every embodiment capable of achieving the objective of the present invention.

REFERENCE SIGNS LIST 100 target object
101 projection
102 recess
103 design surface
1 support device
2 movable body
3 casing body
4 biasing body
5 control mechanism The specification, the claims, the drawings, and the abstract of Japanese Patent Application No. 2021-207002, filed on Dec. 21, 2021, are hereby cited and incorporated herein in their entirety, as the disclosure of the specification of the present invention.

What is claimed is:

1. A support device provided on each of two walls facing each other, the support device comprising:
   a movable body that is configured to form a part of a design surface of each of the walls at a reference position, in a manner movable between an advanced position for forming a projection usable for a purpose of hooking on each of the walls, and a retracted position for forming a recess usable for a purpose of fitting on the target object;
   a casing body movably supporting the movable body, the casing body being configured to be attached to each of the walls;
   a biasing body urging the movable body toward the advanced position; and
   a control mechanism for the movable body, wherein
   the control mechanism is configured to perform a cycle of controlling the movable body, the cycle including controls to
      temporarily hold the movable body at the reference position;
      first push the movable body at the reference position toward the retracted position against the biasing force;
      move the movable body by the biasing force after the first push control, to the advanced position;
      second push the movable body at the advanced position against the biasing force; and
      move the movable body by the biasing force after the second push control, to the reference position, and wherein
   the casing body of the support device provided on one of the two walls is enabled to receive one end of a rod-like body to an inside of the casing body, and the casing body of the support device provided on the other of the two walls is enabled to receive the other end of the rod-like body to an inside of the casing body, while the movable body is at the retracted position.

2. The support device according to claim 1, wherein the control mechanism includes a heart cam, and a pin configured to trace the heart cam, and one of the heart cam and the pin is provided to the movable body, and another of the hart cam and the pin is provided to the casing body.

3. The support device according to claim 1, wherein the biasing body is a compressed coil spring disposed between the movable body and the casing body.

4. The support device according to claim 1, wherein the casing body includes an engaging counterpart that is engaged with an engaging portion provided to the movable body, wherein one of the engaging portion and the engaging counterpart is an elongated guide hole extending in a direction of a movement of the movable body, and another one of the engaging portion and the engaging counterpart is an elastic piece that enables entry of the movable body into the casing body by elastically deforming, and that enters the elongated guide hole by elastically recovering at a predetermined insertion position.

5. The support device according to claim 1, wherein the casing body has a projection opening for the movable body, and is assembled and fixed to the target object in such a manner that the projection opening communicates with a pass-through hole provided to the target object, on a non-design surface that is on an inner side of the target object.

6. A support device provided on each of two walls facing each other, the support device comprising:
- a movable body that is configured to form a part of a design surface of each of the walls at a reference position, in a manner movable between an advanced position for forming a projection usable for a purpose of hooking on each of the walls, and a retracted position for forming a recess usable for a purpose of fitting on the target object;
- a casing body movably supporting the movable body, the casing body being configured to be attached to each of the walls;
- a biasing body urging the movable body toward the advanced position; and
- a control mechanism for the movable body, wherein the control mechanism is configured to perform a cycle of controlling the movable body, the cycle including controls to
- temporarily hold the movable body at the reference position;
- first push the movable body at the reference position toward the retracted position against the biasing force;
- move the movable body by the biasing force after the first push control, to the advanced position;
- second push the movable body at the advanced position against the biasing force; and
- move the movable body by the biasing force after the second push control, to the reference position, wherein the casing body has a projection opening for the movable body, an outer collar at the projection opening and a projecting piece provided behind the outer collar and projecting outwards; and the casing body is fixed to the target object by using a pass-through hole provided to the target object and a cutout that is continuous to the pass-through hole and through which the projecting piece is passed, the casing body being fixed by inserting a part of the casing body including the projecting piece behind the outer collar into the target object, and turning the casing body to clamp the target object between the outer collar and the projecting piece from outside and inside, respectively.

* * * * *